(12) United States Patent
Tanaka et al.

(10) Patent No.: US 10,970,237 B2
(45) Date of Patent: Apr. 6, 2021

(54) STORAGE SYSTEM

(71) Applicant: Hitachi, Ltd., Tokyo (JP)

(72) Inventors: Katsuya Tanaka, Tokyo (JP); Kentaro Shimada, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/561,154

(22) Filed: Sep. 5, 2019

(65) Prior Publication Data
US 2020/0226078 A1 Jul. 16, 2020

(30) Foreign Application Priority Data

Jan. 15, 2019 (JP) ............................ JP2019-004734

(51) Int. Cl.
| | |
|---|---|
| *G06F 13/16* | (2006.01) |
| *G06F 12/0806* | (2016.01) |
| *G06F 13/28* | (2006.01) |
| *G06F 13/42* | (2006.01) |
| *G06F 13/40* | (2006.01) |

(52) U.S. Cl.
CPC ...... *G06F 13/1668* (2013.01); *G06F 12/0806* (2013.01); *G06F 13/28* (2013.01); *G06F 13/4022* (2013.01); *G06F 13/4282* (2013.01); *G06F 2212/304* (2013.01); *G06F 2213/0026* (2013.01)

(58) Field of Classification Search
CPC .. G06F 12/0806; G06F 13/1668; G06F 13/28; G06F 13/4022; G06F 13/4282; G06F 2212/304; G06F 2213/0026
See application file for complete search history.

(56) References Cited

U.S. PATENT DOCUMENTS

| | | | | |
|---|---|---|---|---|
| 9,336,173 | B1* | 5/2016 | Sodke | G06F 3/0665 |
| 2008/0301385 | A1* | 12/2008 | Nagata | G06F 3/0683 |
| | | | | 711/162 |
| 2009/0204743 | A1* | 8/2009 | Inoue | G06F 11/201 |
| | | | | 711/100 |
| 2011/0153875 | A1* | 6/2011 | Khericha | G06F 13/28 |
| | | | | 710/22 |
| 2013/0254487 | A1* | 9/2013 | Tanaka | G06F 12/0808 |
| | | | | 711/123 |
| 2014/0067984 | A1* | 3/2014 | Danilak | H04L 67/1097 |
| | | | | 709/213 |
| 2014/0112131 | A1* | 4/2014 | Todaka | H04L 47/2433 |
| | | | | 370/230 |
| 2016/0203080 | A1* | 7/2016 | Bert | G06F 11/16 |
| | | | | 711/114 |
| 2018/0314666 | A1* | 11/2018 | Tanaka | G06F 13/1668 |
| 2019/0012290 | A1* | 1/2019 | Watanabe | G06F 13/385 |

* cited by examiner

*Primary Examiner* — Eric T Oberly
(74) *Attorney, Agent, or Firm* — Baker Botts L.L.P.

(57) ABSTRACT

A first storage controller includes a first processor, a first memory, and a first switch having a first port. A second storage controller includes a second processor, a second memory, and a second switch having a second port. A storage system connects the first port and the second port by a first link. The first processor and the first switch are connected by a second link configured to transfer user data and a third link configured to transfer control data. The second processor and the second switch are connected by a fourth link configured to transfer user data and a fifth link configured to transfer control data. The first port and the second port transfer the control data in preference to the user data on the first link.

9 Claims, 17 Drawing Sheets

FIG. 5

| Phase07 | Phase06 | Phase05 | Phase04 | Phase03 | Phase02 | Phase01 | Phase00 |
|---|---|---|---|---|---|---|---|
| UP00 | UP00 | UP00 | NT00 | UP00 | UP00 | UP00 | UP00 |
| Phase15 | Phase14 | Phase13 | Phase12 | Phase11 | Phase10 | Phase09 | Phase08 |
| UP00 | NT00 | UP00 | UP00 | UP00 | UP00 | NT00 | UP00 |
| Phase23 | Phase22 | Phase21 | Phase20 | Phase19 | Phase18 | Phase17 | Phase16 |
| UP00 | UP00 | UP00 | UP00 | NT00 | UP00 | UP00 | UP00 |
| Phase31 | Phase30 | Phase29 | Phase28 | Phase27 | Phase26 | Phase25 | Phase24 |
| UP00 | UP00 | NT00 | UP00 | UP00 | UP00 | UP00 | NT00 |

FIG. 10

| | LINK BETWEEN MP AND PCIe SW (1001) | INTER-CONTROLLER LINK (1002) |
|---|---|---|
| USER DATA (1003) | TC0/VC0 | TC0/VC0 |
| CONTROL DATA (MP Core) (1004) | TC0/VC0 | TC0/VC0 |
| CONTROL DATA (SW DMA) (1005) | TC1/VC0 | TC1/VC1 |

FIG. 11

| | VC0 (1101) | VC1 (1102) |
|---|---|---|
| Priority (1103) | Low | High |

FIG. 12

| | LINK BETWEEN MP AND PCIe SW (1201) | INTER-CONTROLLER LINK (1202) |
|---|---|---|
| USER DATA (1203) | TC0/VC0 | TC0/VC0 |
| CONTROL DATA (MP Core) (1204) | TC1/VC0 | TC1/VC1 |
| CONTROL DATA (SW DMA) (1205) | TC1/VC0 | TC1/VC1 |

STORAGE SYSTEM

CLAIM OF PRIORITY

The present application claims priority from Japanese patent application JP 2019-004734 filed on Jan. 15, 2019, the content of which is hereby incorporated by reference into this application.

BACKGROUND OF THE INVENTION

1. Field of the Invention

The present invention relates to a storage system including a plurality of storage controllers.

2. Description of the Related Art

A storage system has a storage controller and a randomly accessible nonvolatile storage medium. This recording medium is, for example, a disk array having a large number of hard disk drives (HDD) and solid state drives (SSD).

The storage controller includes: a frontend interface configured to connect a host system (host system or the like); a backend interface configured to connect a disk array; and a cache memory (abbreviated as CM) that temporarily stores user data read and write from and to the disk array by the host system. Furthermore, the storage controller includes a processor configured to control data transfer between the host system and the cache memory and between the disk array and the cache memory.

In addition, "NVM Express (abbreviated as NVMe)" has recently been newly used as a standard specification of communication between the storage controller and the solid state drive (SSD). In a storage system including only an NVMe drive as a recording medium, a processor and the drive can be directly connected via a switch, and thus, a backend interface is unnecessary.

In a storage system equipped with a plurality of processors, a shared memory (abbreviated as SM), which is accessible from the plurality of processors and stores control data of the storage system, is provided in a storage controller. Examples of the control data of the storage system include address information of a data storage destination referred to by the host system, an address translation table to translate the data storage destination address information on a disk array internally used in the storage system.

In a storage system that requires high reliability, user data and control data are redundantly held, and thus, components inside the storage controller, including a cache memory and a shared memory, are duplicated.

In a storage controller to which a commodity technology is applied, a cache memory and a shared memory are configured inside a main memory connected to a processor. In addition, "PCI Express (abbreviated as PCIe)" has been known as a standard specification of a communication network configured to connect a processor, a frontend interface, a backend interface, an NVMe drive, and the like.

Storage controllers are interconnected by an inter-controller link using a PCIe switch or a non transparent bridge (NTB). Processors mounted on the plurality of storage controllers mutually transfer user data and control data using the inter-controller link.

For example, US 2013/0254487 discloses a technology in which two storage controllers are interconnected by a PCIe switch or an NTB to perform data transfer between the controllers.

SUMMARY OF THE INVENTION

When user data with a long transfer length (large payload size) and control data with a short transfer length (small payload size) are transferred in a congested (mixed) manner on the same inter-controller link, the throughput of the control data decreases so that a data transfer time also increases. Such deterioration in transfer performance of the control data causes deterioration in response performance of a storage system.

In PCIe, a mechanism including a virtual channel (VC) and a traffic class (TC) is prepared in order to guarantee quality of service (QoS). The virtual channel is a unit to perform independent flow control on a PCIe link, and the traffic class is a priority of packet transfer in the PCIe.

The storage controller transfer user data and control data in different virtual channels using the above mechanism so that deterioration in the transfer performance of control data is necessarily avoided when being congested with user data. However, there is a commodity processor including the only one virtual channel. Therefore, when the commodity processor is adopted as the storage controller, there is a problem that it is difficult to use a plurality of virtual channels.

In addition, the problem of congestion does not occur if user data and control data are transferred in physically separate paths, but the amount of wiring such as the number of cables and PCIe lanes is doubled so that there is a problem that cost increases.

An object of the invention is to prevent transfer performance of control data from deteriorating at the time of congestion with user data even on an inter-controller link of a storage controller equipped with a commodity processor including the only one virtual channel.

The invention relates to a storage system including a first storage controller and a second storage controller. The first storage controller includes: a first processor; a first memory connected to the first processor; a first switch which is connected to the first processor and has a first port; a cache memory area which is set in the first memory and stores user data; and a shared memory area which is set in the first memory and stores control data. The second storage controller includes: a second processor; a second memory connected to the second processor; a second switch which is connected to the second processor and has a second port; a cache memory area which is set in the second memory and stores user data; and a shared memory area which is set in the second memory and stores control data. The storage system connects: the first port and the second port by a first link; the first processor and the first switch by a second link configured to transfer the user data and a third link configured to transfer the control data; and the second processor and the second switch by a fourth link configured to transfer the user data and a fifth link configured to transfer the control data. The first port and the second port transfer the control data in preference to the user data on the first link.

Therefore, according to one aspect of the invention, it is possible to prevent the transfer performance of the control data from deteriorating due to the congestion with the user data transfer even on the inter-controller link of the storage controller equipped with the commodity processor including the only one virtual channel, and it is possible to improve the response performance of the storage system. As a result, a transfer time of the control data can be reduced, and the performance of the storage system can be improved.

Details of at least one embodiment of a subject matter disclosed in this specification are set forth in the accompanying drawings and the following description. Other features, aspects, and effects of the disclosed subject matter will be apparent from the following disclosure, drawings, and claims.

BRIEF DESCRIPTION OF THE DRAWINGS

FIG. 5 is a table illustrating the first embodiment of the invention, and illustrating a setting example an arbitration table in a PCIe switch port;

FIG. 10 is a table illustrating the second embodiment of the invention and illustrating an example of a relationship among a data type, a traffic class, and a virtual channel;

FIG. 11 is a table illustrating the second embodiment of the invention and illustrating a setting example of virtual channel arbitration in a PCIe switch port;

FIG. 12 is a table illustrating a third embodiment of the invention and illustrating another example of a relationship among a data type, a traffic class, and a virtual channel;

DESCRIPTION OF THE PREFERRED EMBODIMENTS

Hereinafter, some embodiments of the invention will be described with reference to the drawings.

First Embodiment

A storage system according to a first embodiment of the invention and processing thereof will be described with reference to FIGS. 1 to 8.

Figure 1:
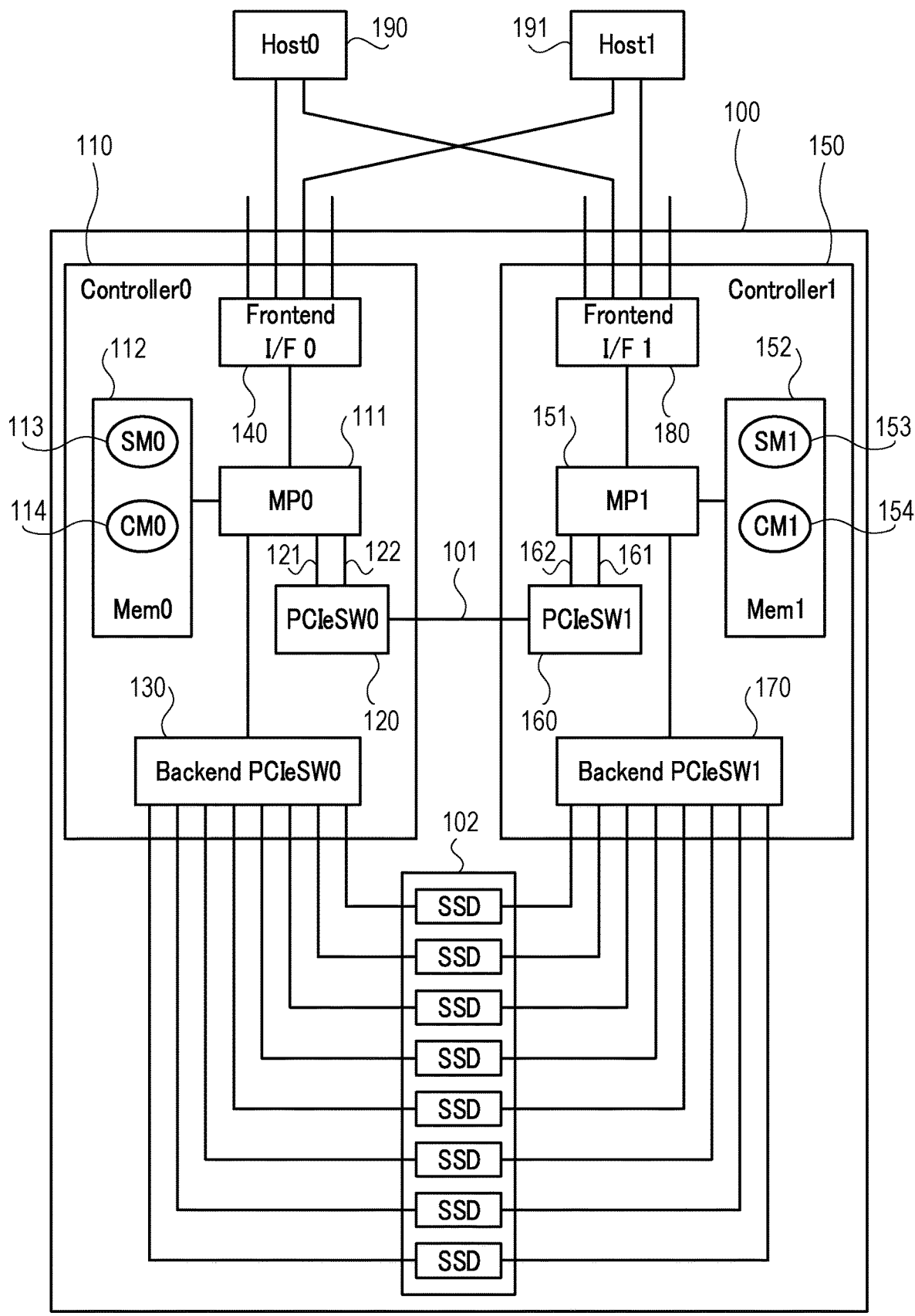
FIG. 1 is a block diagram illustrating a first embodiment of the invention and illustrating an example of a configuration of a storage system.

FIG. 1 is a block diagram illustrating an example of a configuration of the storage system according to the first embodiment of the invention. A storage system 100 includes storage controllers 110 and 150 and a plurality of solid state drives (SSDs) 102.

The storage controllers 110 and 150 are connected to external host system 190 and host system 191. The host systems 190 and 191 are, for example, host computers that read and write data from and to the storage system 100. The solid state drive (SSD) 102 is a non-volatile memory express (NVMe) drive.

The storage controller 110 includes a processor (MP0 in FIG. 1) 111, a main memory (Mem0 in FIG. 1) 112, a frontend interface 140, and PCIe switches 120 and 130.

The main memory 112 is connected to the processor 111, and includes a shared memory (SM0 in FIG. 1) 113 and a cache memory (CM0 in FIG. 1) 114. The main memory 112 also stores a program to be executed by the processor 111 and a management table to be referred to.

The processor 111 controls data transfer between the frontend interface 140 and the cache memory 114 and between the cache memory 114 and the solid state drive 102 via the PCIe switch 130.

The PCIe switch 120 is connected to the processor 111 via two PCIe links 121 and 122. The PCIe switch 120 is also connected to an inter-controller link 101, which is a PCIe link, in order for connection with another storage controller.

Similarly, the storage controller 150 includes a processor (MP1 in FIG. 1) 151, a main memory (Mem1 in FIG. 1) 152, a frontend interface 180, and PCIe switches 160 and 170.

The main memory 152 is connected to the processor 151, and includes a shared memory (SM1 in FIG. 1) 153 and a cache (CM1 in FIG. 1) memory 154. The main memory 152 also stores a program to be executed by the processor 151 and a management table to be referred to.

The processor 151 controls data transfer between the frontend interface 180 and the cache memory 154 and between the cache memory 154 and the solid state drive 102 via the PCIe switch 170.

The PCIe switch 160 is connected to the processor 151 via two PCIe links 161 and 162. The PCIe switch 160 is also connected to the inter-controller link 101, which is the PCIe link, in order for connection with another storage controller.

The processor 111 and the processor 151 communicate with each other via the inter-controller link 101, and temporarily store user data received from the host systems (Host0 and Host1 in FIGS. 1) 190 and 191 to be duplexed in the cache memories 114 and 154.

In addition, the processor 111 and the processor 151 communicate with each other via the inter-controller link 101, and store control data in the storage system 100 to be duplexed in the shared memories 113 and 153.

Figure 2:
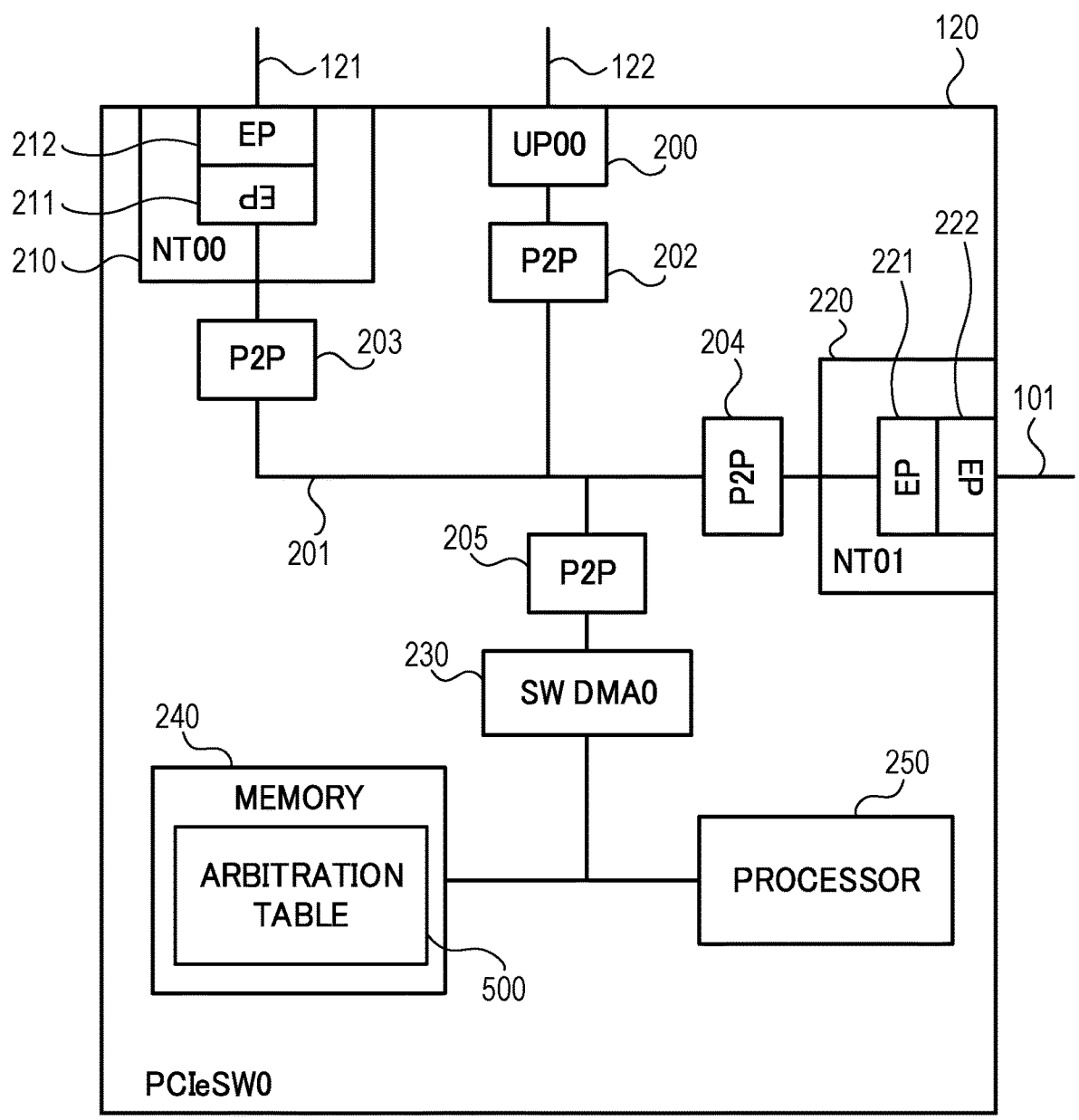
FIG. 2 is a block diagram illustrating the first embodiment of the invention and illustrating an example of a configuration inside a PCIe switch.

FIG. 2 is a block diagram illustrating an example of an internal configuration of the PCIe switch 120. The PCIe switch 120 includes an upstream port 200 connected to the PCIe link 122, a non transparent bridge (NTB) 210, an NTB 220, a direct memory access (DMA) controller 230 built in the PCIe switch, a processor 250, and a memory 240.

The upstream port (UP00 in FIG. 2) 200 is connected to a PCI-to-PCI (P2P) bridge (P2P in FIG. 2) 202, an endpoint 211 in the NTB 210 (NT00 in FIG. 2) is connected to a P2P bridge 203, an endpoint (EP in FIG. 2) 221 in the NTB 220 (NT01 in FIG. 2) is connected to a P2P bridge 204, and the DMA controller 230 built in the PCIe switch is connected to a P2P bridge 205. The P2P bridges 202, 203, 204, and 205 are connected to an internal bus 201.

The NTB 210 includes the endpoint 211 and an endpoint 212. The endpoint 212 is set to be accessible from the processor 111 via the PCIe link 121.

The endpoint 211 is set to be accessible from the processor 111 via the PCIe link 122. The endpoints 211 and 212 are set and connected such that PCIe packets of which transmission destinations are within a predetermined address range can pass in both directions.

The NTB 220 includes the endpoint 221 and an endpoint 222. The endpoint 221 is set to be accessible from the processor 111 via the PCIe link 122.

The endpoint 222 is connected to the inter-controller link. The endpoints 221 and 222 are set and connected such that PCIe packets of which transmission destinations are within a predetermined address range can pass in both directions.

The memory 240 stores a control program, a table, and the like. In the first embodiment, an example in which an arbitration table 500 (to be described later) is stored as a table to be used by the processor 250 is illustrated. The processor 250 executes a control program of the memory 240 to control each unit in the PCIe switch 120.

Incidentally, an internal configuration of the PCIe switch 160 of the storage controller 150 illustrated in FIG. 1 is the same as the internal configuration of the PCIe switch 120 illustrated in FIG. 2, and thus, will not be described.

Figure 3:
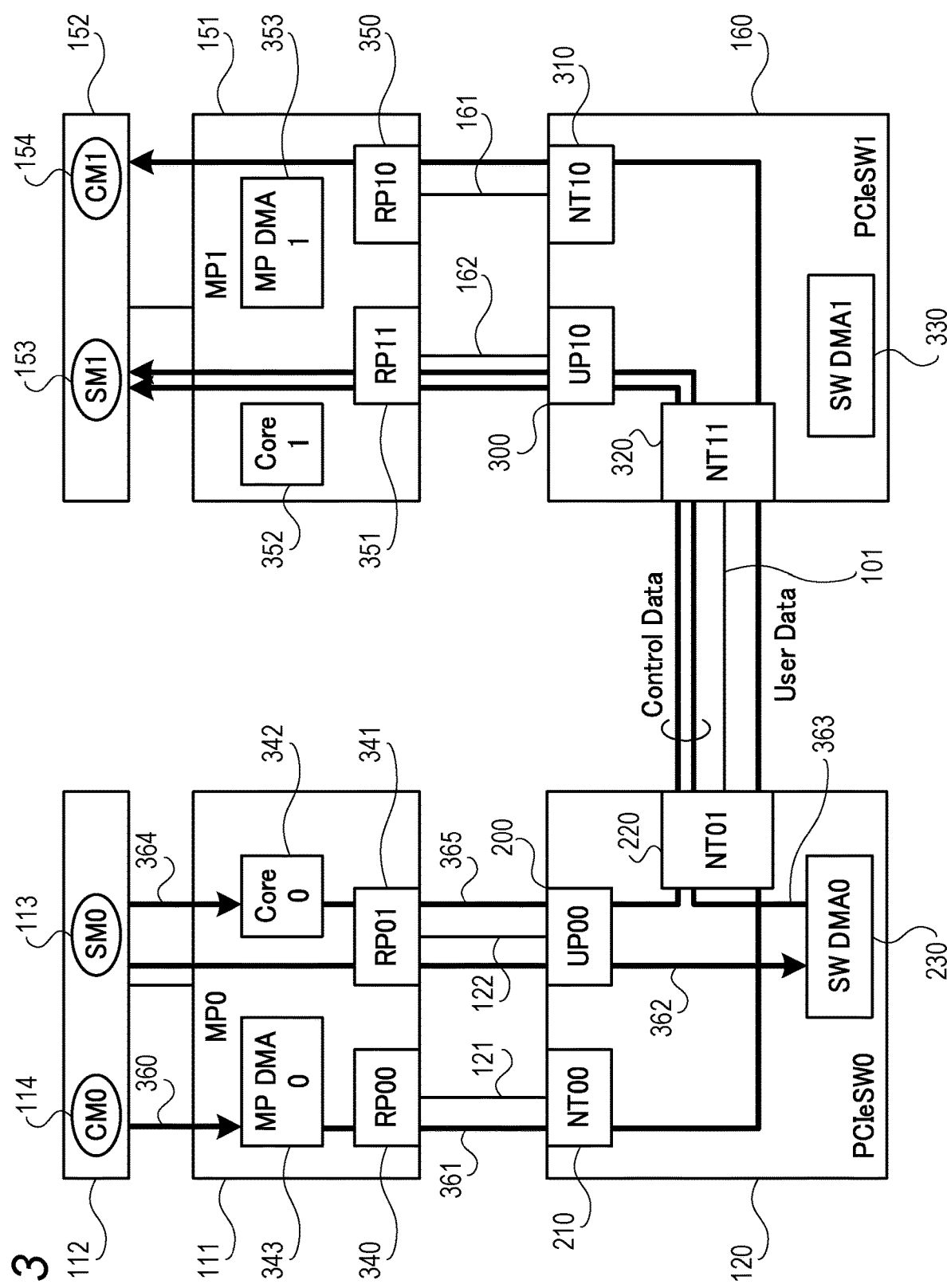
FIG. 3 is a diagram illustrating the first embodiment of the invention and illustrating an example of a data transfer path between storage controllers.

FIG. 3 is a diagram illustrating transfer paths of control data and user data from the storage controller 110 to the storage controller 150.

The processor 111 includes a processor core 342 and a DMA controller 343 built in the processor. In addition, the processor 111 include: a root port 340 (RP00 in FIG. 3) connected to the NTB 210 (NT00 in FIG. 3) of the PCIe switch 120 via the PCIe link 121; and a root port 341 (RP01 in FIG. 3) connected to the upstream port 200 (UP00 in FIG. 3) via the PCIe link 122.

The processor 151 includes a processor core 352 and a DMA controller 353 built in the processor. In addition, the processor 151 include: a root port 350 (RP10 in FIG. 3) connected to an NTB 310 (NT10 in FIG. 3) of the PCIe switch 160 via the PCIe link 161; and a root port 351 (RP11 in FIG. 3) connected to the upstream port 300 (UP10 in FIG. 3) via the PCIe link 162.

First, the transfer path of user data will be described. The user data is transferred from the cache memory 114 to the cache memory 154 of the storage controller 150 as the processor 111 controls the DMA controller 343 built in the processor.

The processor 111 generates a data transfer list to control the DMA controller 343 built in the processor. The DMA controller 343 built in the processor reads user data from the cache memory 114, which is a transfer source, based on the data transfer list (360), and writes the user data to the root port 340 (RP00) (361).

The user data is transferred from the root port 340 to the cache memory 154 via the PCIe link 121, the NTB 210, the NTB 220, the inter-controller link 101, the NTB 320, the NTB 310, the PCIe link 161, and the root port 350.

Next, the transfer path of control data will be described. There are two transfer methods for the control data. One is a method in which the processor core 342 executes a write command with respect to a PCIe space (address space), and this method will be referred to as core write hereinafter. The other is a method using DMA controllers 230 and 330 built in the PCIe switches.

In the case of transfer of control data by the core write, first, the processor core 342 reads the control data from the shared memory 113 which is a transfer source (364), and writes the control data to the root port 341 (365). The control data is transferred from the root port 341 to the shared memory 153 via the PCIe link 122, the upstream port 200, the NTB 220, the inter-controller link 101, the NTB 320, the upstream port 300, the PCIe link 162, and the root port 351.

In the case of transfer of control data by the DMA controller 230 built in the PCIe switch, the processor 111 generates a data transfer list to control the DMA controller 230 built in the PCIe switch. The DMA controller 230 built in the PCIe switch reads the control data from the shared memory 113, which is a transfer source, via the root port 341, the PCIe link 122, and the upstream port 200 based on the data transfer list (362), and writes the control data to the NTB 220 (363).

The control data is transferred from the NTB 220 to the shared memory 153 of the storage controller 150 via the inter-controller link 101, the NTB 320, the upstream port 300, the PCIe link 162, and the root port 351.

The same description is also applied for a path in the case of transferring control data from the storage controller 150 to the storage controller 110.

The user data of the storage controller 150 is transferred from the cache memory 154 to the cache memory 114 of the storage controller 110 as the processor 151 controls the DMA controller 353 (MP DMA1) built in the processor.

The processor 151 generates a data transfer list to control the DMA controller 353 (MP DMA 1) built in the processor. The DMA controller 353 built in the processor reads user data from the cache memory 154, which is a transfer source, based on the data transfer list, and writes the user data to the root port 350.

The user data is transferred from the root port 350 to the cache memory 114 of the storage controller 110 via the PCIe link 161, the NTB 310, the NTB 320, the inter-controller link 101, the NTB 220, the NTB 210, the PCIe link 121, and the root port 340.

In the case of control data transfer by the core write, first, the processor core 352 reads the control data from the shared memory 153 which is a transfer source, and writes the control data to the root port 351.

The control data is transferred from the root port 351 to the shared memory 113 of the storage controller 110 via the PCIe link 162, the upstream port 300, the NTB 320, the inter-controller link 101, the NTB 220, the upstream port 200, the PCIe link 122, and the root port 341.

In the case of control data transfer by the DMA controller 330 built in the PCIe switch, the processor 151 generates a data transfer list to control the DMA controller 330 built in the PCIe switch. The DMA controller 330 built in the PCIe switch reads the control data from the shared memory 153, which is a transfer source, via the root port 351, the PCIe link 162, and the upstream port 300 based on the data transfer list, and writes the control data to the NTB 320.

The control data is transferred from the NTB 320 to the shared memory 113 of the storage controller 110 via the inter-controller link 101, the NTB 220, the upstream port 200, the PCIe link 122, and the root port 341.

Figure 4:
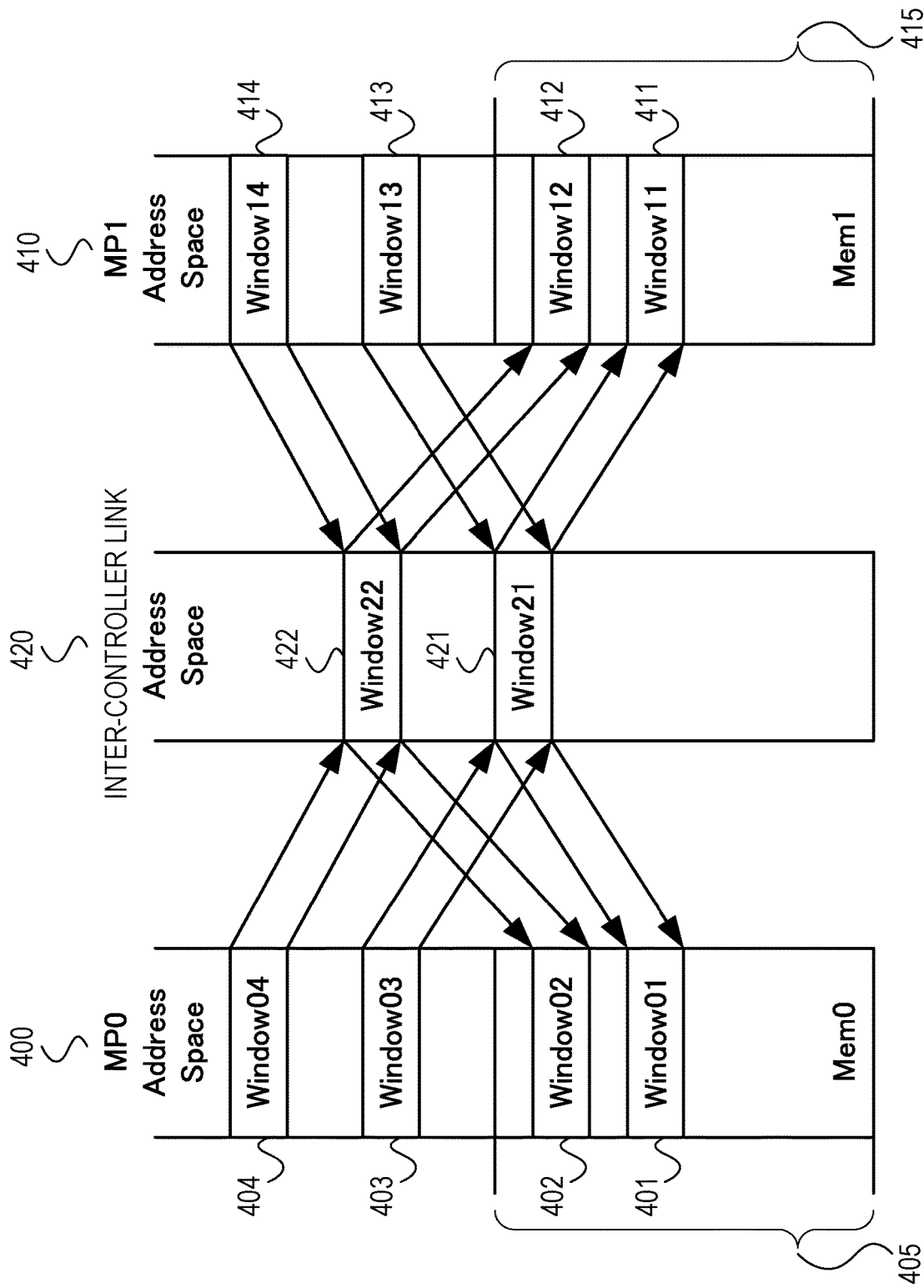
FIG. 4 is a diagram illustrating the first embodiment of the invention and illustrating an example of an address translation operation in an NTB.

An address translation operation in the PCIe switches 120 and 160 will be described with reference to FIG. 4. In FIG. 4, an address space 400 of the processor 111 includes: a main memory space 405 of the processor 111; a window 403 (Window03 in FIG. 4) configured to access the upstream port 200; and a window 404 (Window04 in FIG. 4) configured to access the NTB 210.

An address space 410 of the processor 151 includes: a main memory space 415 of the processor 151; a window 413 (Window13 in FIG. 4) configured to access the upstream port 300; and a window 414 (Window14 in FIG. 4) configured to access the NTB 310.

The main memory space 405 includes a window 401 (Window01 in FIG. 4) configured to access the shared memory 113 and a window 402 (Window02 in FIG. 4) configured to access the cache memory 114. The main memory space 415 of the storage controller 150 includes a window 411 (Window11 in FIG. 4) configured to access the shared memory 153 and a window 412 (Window12 in FIG. 4) configured to access the cache memory 154.

The address space 420 is an address space used when a PCIe packet is transferred on the inter-controller link 101, and includes a window 421 for control data transfer (Window21 in FIG. 4) and a window 422 for user data transfer (Window22 in FIG. 4).

In the following description, an address space used by PCIe among the above address spaces 400, 410, and 420 is sometimes referred to as a PCI space.

First, a translation operation of a PCIe packet transmission destination address in the PCIe switch 120 will be described. The NTBs 210 and 220 are address translation units, respectively, and a combination thereof is also an address translation unit.

The PCIe switch 120 translates a transmission destination address of a PCIe packet in the window 403 received by the upstream port 200 into an address in the window 421 and transmits the PCIe Packet with the translated address from the NTB 220. In addition, the PCIe switch 120 translates a transmission destination address of a PCIe packet in the window 404 received by the NTB 210 into an address in the window 422 and transmits the PCIe Packet with the translated address from the NTB 220.

In addition, the PCIe switch 120 translates a transmission destination address of a PCIe packet in the window 421 received by the NTB 220 into an address in the window 401 and transmits the PCIe Packet with the translated address from the upstream port 200.

In addition, the PCIe switch 120 translates a transmission destination address of a PCIe packet in the window 422 received by the NTB 220 into an address in the window 402 and transmits the PCIe Packet with the translated address from NTB 210.

Next, a translation operation of a PCIe packet transmission destination address in the PCIe switch 160 will be described. The NTBs 310 and 320 are address translation units, respectively, and a combination thereof is also an address translation unit.

The PCIe switch 160 translates a transmission destination address of a PCIe packet in the window 413 received by the upstream port 300 into an address in the window 421 and transmits the PCIe Packet with the translated address from the NTB 320.

In addition, the PCIe switch 160 translates a transmission destination address of a PCIe packet in the window 414 received by the NTB 310 into an address in the window 422 and transmits the PCIe Packet with the translated address from the NTB 320.

In addition, the PCIe switch 160 translates a transmission destination address of a PCIe packet in the window 421 received by the NTB 320 into an address in the window 411 and transmits the PCIe Packet with the translated address from the upstream port 300.

In addition, the PCIe switch 160 translates a transmission destination address of a PCIe packet in the window 422 received by the NTB 320 into an address in the window 412 and transmits the PCIe Packet with the translated address from the NTB 310.

FIG. 5 is a table illustrating an example of the arbitration table 500 to control the NTB 220. The processor 250 command a content set in the arbitration table 500 to the NTB 220.

The NTB 220 also functions as an upstream port of the PCIe switch 120. The NTB 220 can receive control data and user data at the NTB 210 and the upstream port 200 and set Weighted Round Robin (WRR) arbitration for a PCIe packet transmitted from the NTB 220.

Here, as an example, the NTB 220 is set according to the arbitration table 500 with 32 phases. As illustrated in FIG. 5, the NTB 210 (NT00) to which user data is input is allocated to six phases among the 32 phases, and the upstream port 200 (UP00) to which control data is input is allocated to the remaining 26 phases.

With this setting, the control data is transmitted from the NTB 220 to the inter-controller link 101 in preference to the user data.

Furthermore, at least four consecutive phases are set as phases allocated for the upstream port 200 (UP00) by which the control data is received. This is because a size of the control data to be transferred is several tens of bytes to at most 1000 bytes, and a payload size of a PCIe packet transferred by the DMA controller 230 built in the PCIe switch is 256 bytes at maximum.

Since the upstream port 200 (UP00) by which control data is received is set to the four consecutive phases, the control data can be transmitted in the consecutively set phases without waiting for passage (transfer completion) of a PCIe packet of user data. In addition, since the control data is allocated to the four consecutive phases, it is possible to enhance a rate at which PCIe packets of the control data are consecutively transmitted from the NTB 220.

The arbitration table 500 is also set for the NTB 320 similarly to FIG. 5.

Although the arbitration table 500 of the first embodiment illustrates an example in which the number of phases of the arbitration table is 32, control data is allocated to the four consecutive phases, and user data is allocated every five phases, the invention is not limited thereto.

Figure 6:
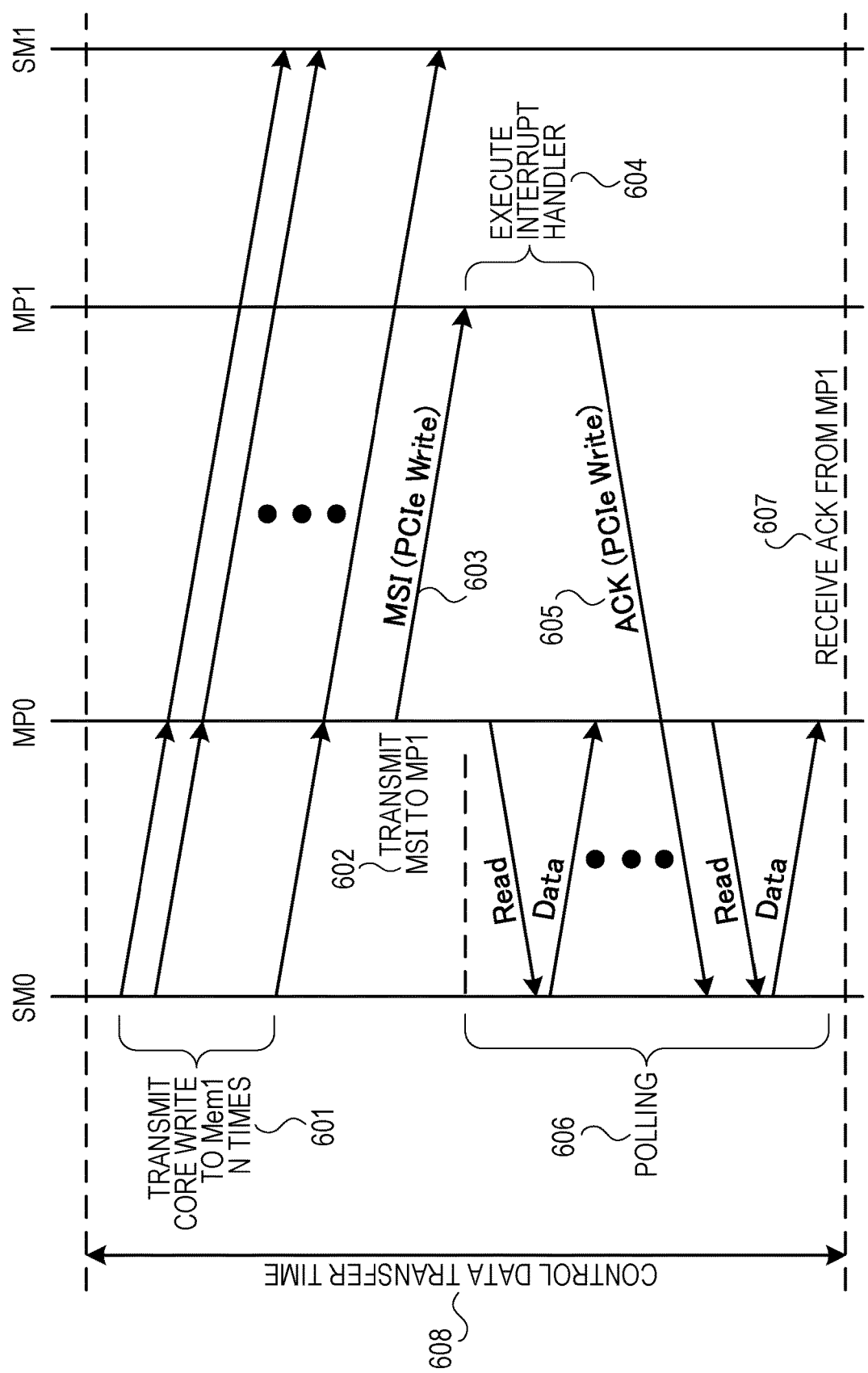
FIG. 6 is a sequence diagram illustrating the first embodiment of the invention and illustrating an example of transfer of control data between the storage controllers.

FIG. 6 is a diagram for describing a control data transfer sequence. As an example, a case where the processor 111 (MP0 in FIG. 6) transfers control data from the shared memory 113 (SM0 in FIG. 6) of the storage controller 110 to the shared memory 153 (SM1 in FIG. 6) of the storage controller 150 is illustrated.

First, the processor 111 reads the control data from the shared memory 113 (SM0) and executes a write command with respect to the PCIe space, that is, the core write, to transfer the control data to the shared memory 153 (SM1) of the main memory 152 (Mem1) (601).

Since a size of data that can be transferred by one-time core write is, for example, 8 bytes, the processor 111 repeatedly executes the core write as many times as necessary to transfer the control data.

Subsequently to the transfer of the control data, the processor 111 (MP0) transmits message signaled interrupt (MSI), which is an interrupt signal, to the processor 151 (MP1) (602). An actual state of the MSI is a PCIe write packet transmitted to an interrupt controller (not illustrated) of the processor 151 (MP1) (603).

The processor 151 (MP1) having received the MSI executes an interrupt handler in response to a content of the interrupt (604). With the execution of the interrupt handler, the processor 151 (MP1) detects that the control data has been certainly written to the shared memory 153 (SM1), and transmits acknowledge (ACK) to notify the completion of write to the processor 111 (MP0). An actual state of the ACK is a PCIe write packet for a predetermined address in the shared memory (605).

After the transmission of the MSI, the processor 111 (MP0) polls the predetermined address of the shared memory 113 (SM0) and waits for the ACK to be replied from the processor 151 (MP1) (606).

The control data transfer is completed as the processor 111 (MP0) detects the reception of the ACK from the processor 151 (MP1) (607).

A transfer time of control data (608) corresponds to a period from the start of the control data transfer by the processor 111 (MP0) (601) and to the detection of reception of the ACK from the processor 151 (MP1) (607).

When the DMA controller 230 or 330 built in the PCIe switch is used instead of the core write, the above-described Step 601 is replaced with transfer of control data by the DMA controller 230, and the above Step 602 is replaced with transmission of the MSI by the DMA controller 230 built in the PCIe switch 120.

The same description is also applied in a case where the processor 151 (MP1) transfers control data from the shared memory 153 (SM1) of the storage controller 150 to the shared memory 113 (SM0) of the storage controller 110.

Figure 7:
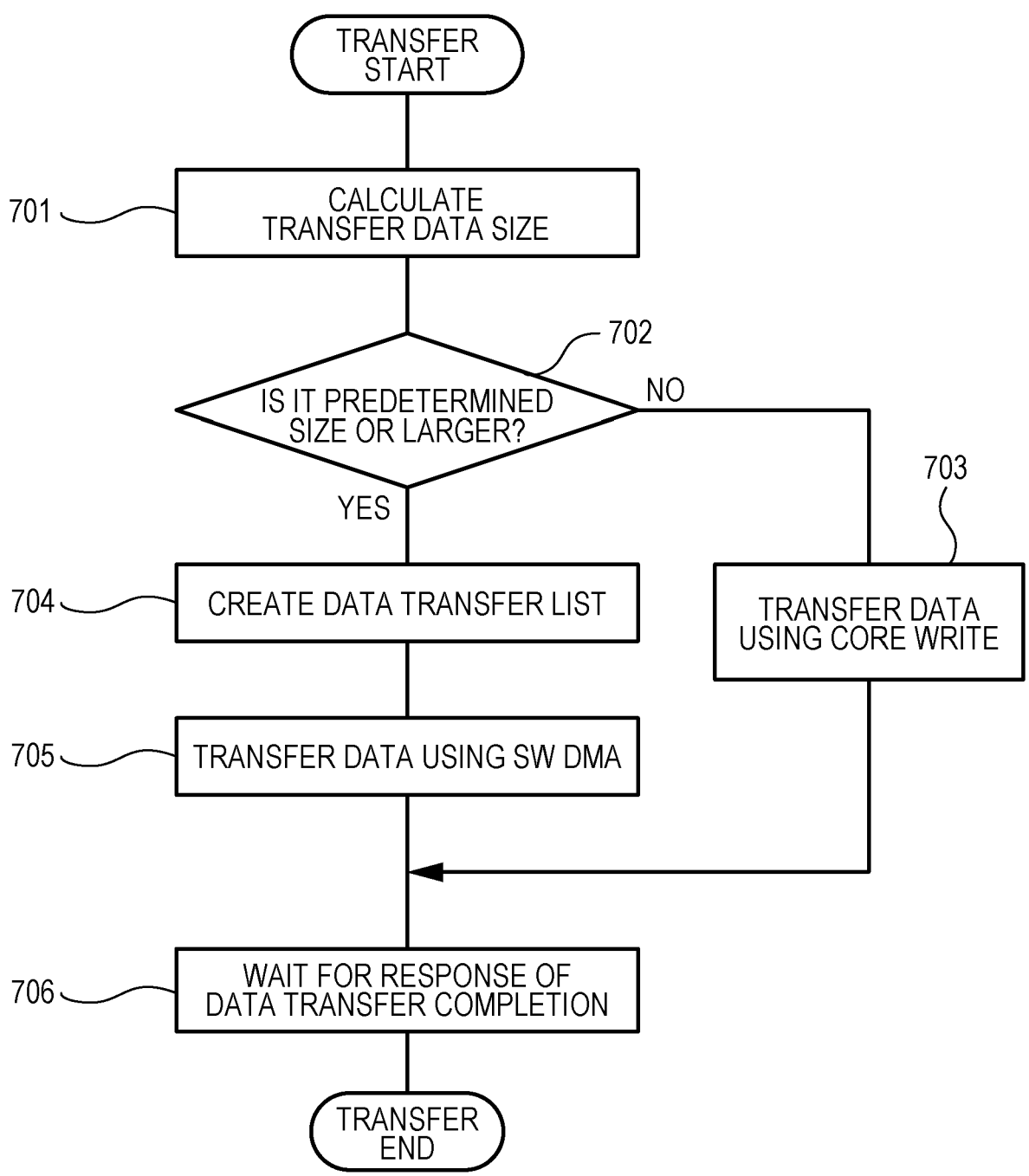
FIG. 7 is a flowchart illustrating the first embodiment of the invention and illustrating a procedure of control data transfer.

FIG. 7 is a flowchart illustrating a procedure of transfer of control data. In the storage system 100 of the first embodiment, control data is transferred between the storage controllers 110 and 150 using a write command (core write) with respect to the PCIe space by the processors 111 and 151 or any one of the components of the DMA controllers 230 and 330 built in the PCIe switches. The flowchart of FIG. 7 illustrates a procedure in which the processor 111 or 151 selects these two components and executes transfer.

First, the processor 111 or 151 calculates a size of control data to be transferred (701).

Next, the processor 111 or 151 determines whether the calculated size of the control data to be transferred is a predetermined value or larger (702). When the DMA controller 230 or 330 built in the PCIe switch transfers data, it is necessary to consider overhead of generation or transmission of a data transfer list.

That is, there is a case where the transfer by core write can reduce the transfer time of the control data more than the transfer by the DMA controller 230 or 330 built in the PCIe switch when the size of the control data is smaller than the predetermined value (or threshold).

If the transfer size of the control data is smaller than the predetermined value, the processor 111 or 151 executes control data transfer by core write (703). Subsequently, the processor 111 or 151 transmits MSI to the other processor as described in the description of FIG. 6.

If the transfer size of the control data is the predetermined value or lager, the processor 111 or 151 generates a data transfer list to allow the DMA controller 230 or 330 built in the PCIe switch to execute control data transfer (704). The data transfer list also includes the MSI transmission described in the description of FIG. 6.

Next, the processor 111 or 151 transmits the generated data transfer list to the DMA controller 230 or 330 built in the PCIe switch. The DMA controller 230 or 330 having received the data transfer list executes the control data transfer (705).

Finally, the processor 111 or 151 detects reception of ACK (see FIG. 6) transmitted from the other processor, whereby the control data transfer is completed (706).

Figure 8:
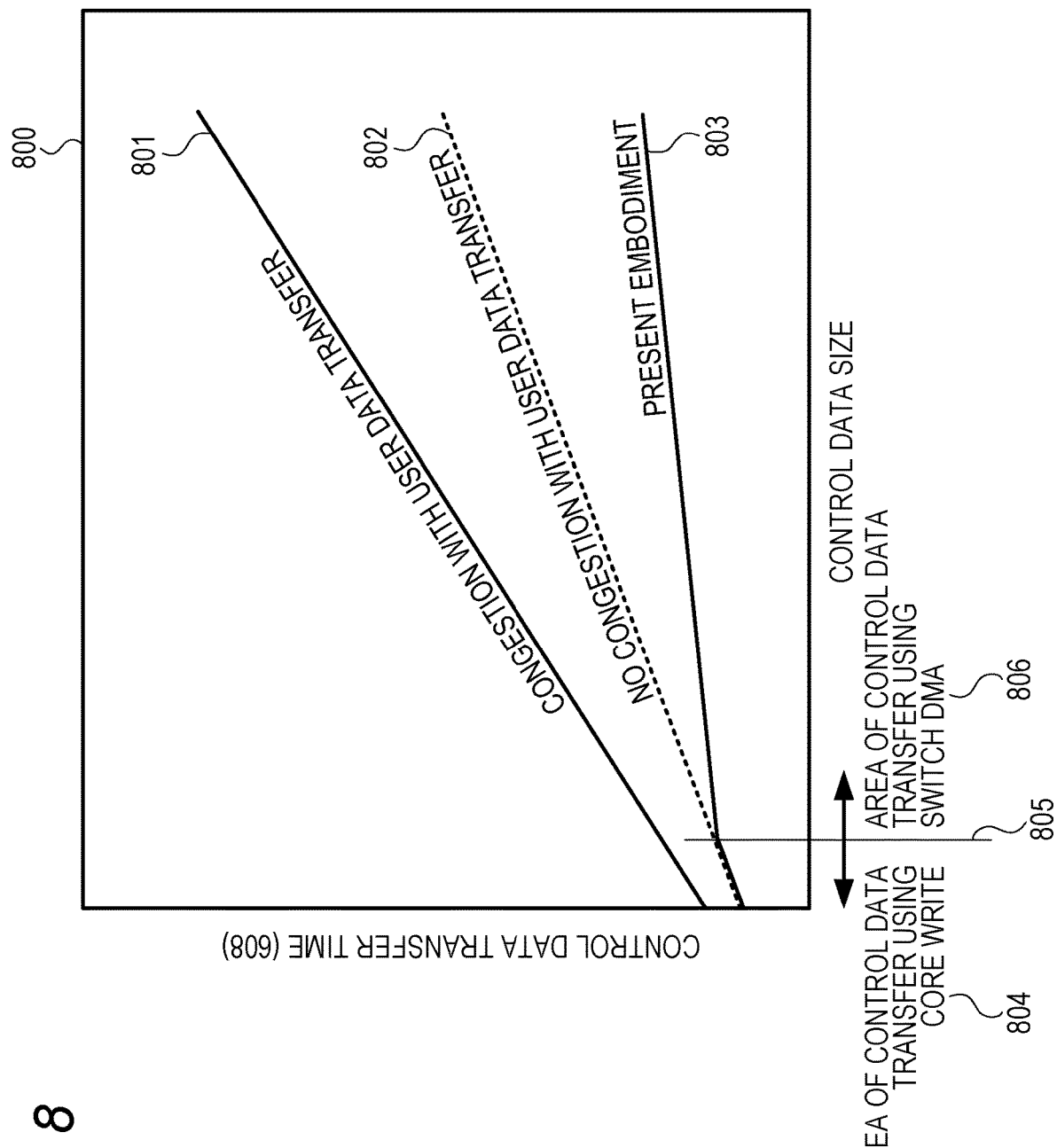
FIG. 8 is a graph illustrating the first embodiment of the invention and illustrating an example of a relationship between a control data size to be transferred between the storage controllers and a control data transfer time.

FIG. 8 is a graph illustrating a relationship between a size of control data and the transfer time (608) of the control data described in FIG. 6 (800).

A solid line 801 and a broken line 802 in FIG. 8 indicate relationships between a size of control data and a transfer time of the control data in the case of transferring the control data by core write in the related art. The solid line 801 indicates a case where transfer of user data and transfer of the control data are congested with each other on the same inter-controller link 101, and the broken line 802 indicates the relationship between transfer time and the size of the control data when the both are not congested with each other.

A solid line 803 in FIG. 8 indicates a relationship between a size of control data and a transfer time of the control data in the storage system 100 of the first embodiment. In an area (804) where the size of control data is smaller than a predetermined value (805), the storage system 100 of the first embodiment executes control data transfer by core write.

The control data transfer time in this case is equivalent to the transfer time (802) of the control data in the case where there is no congestion in the related art. This is obtained as a result of transferring the control data in preference to the user data by setting the port arbitration described in FIG. 5.

In an area (806) where the size of control data is the predetermined value (805) or larger, the storage system 100 according to the first embodiment transfers the control data by the DMA controller 230 or 330 built in the PCIe switch, and as a result, the transfer time of the control data can be shortened as compared to the related art.

In the related art, the control data is not transferred in preference to the user data even if a DMA controller is used for the control data transfer, and thus, it is difficult to shorten the transfer time of the control data when the control data transfer and the user data transfer are congested with each other.

On the other hand, the storage system 100 of the first embodiment transfers the user data and the control data respectively using the DMA controllers 343 and 353 built in the processors and the DMA controllers 230 and 330 built in the PCIe switches on different data transfer paths. Then, the control data is transferred in preference to the user data in the ports (NTBs 220 and 320) of the PCIe switches 120 and 160 where the both join together so that the transfer time of the control data can be shortened.

Second Embodiment

A storage system according to a second embodiment of the invention and processing thereof will be described with reference to FIGS. 9 to 11. A configuration of the storage system of the second embodiment is the same as that of the storage system 100 of FIG. 1 except for a part of the configuration, and thus, the description based on the drawings will be omitted.

The storage system according to the second embodiment includes PCIe switches 920 and 960 (see FIG. 9) that can use a plurality of virtual channels (VCs) instead of the PCIe switches 120 and 160.

Further, the inter-controller link 101 can use two virtual channels VC0 and VC1, which is different from the storage system 100 according to the first embodiment. In addition, the PCIe switch built-in DMA controllers 230 and 330 built in the PCIe switches 920 and 960, respectively, can perform data transfer using PCIe packets of which traffic classes (TC) are set to TC1. Incidentally, the virtual channel is a unit to perform independent flow control on a PCIe link, and the traffic class is a priority of packet transfer in the PCIe as described in the above conventional example.

Figure 9:
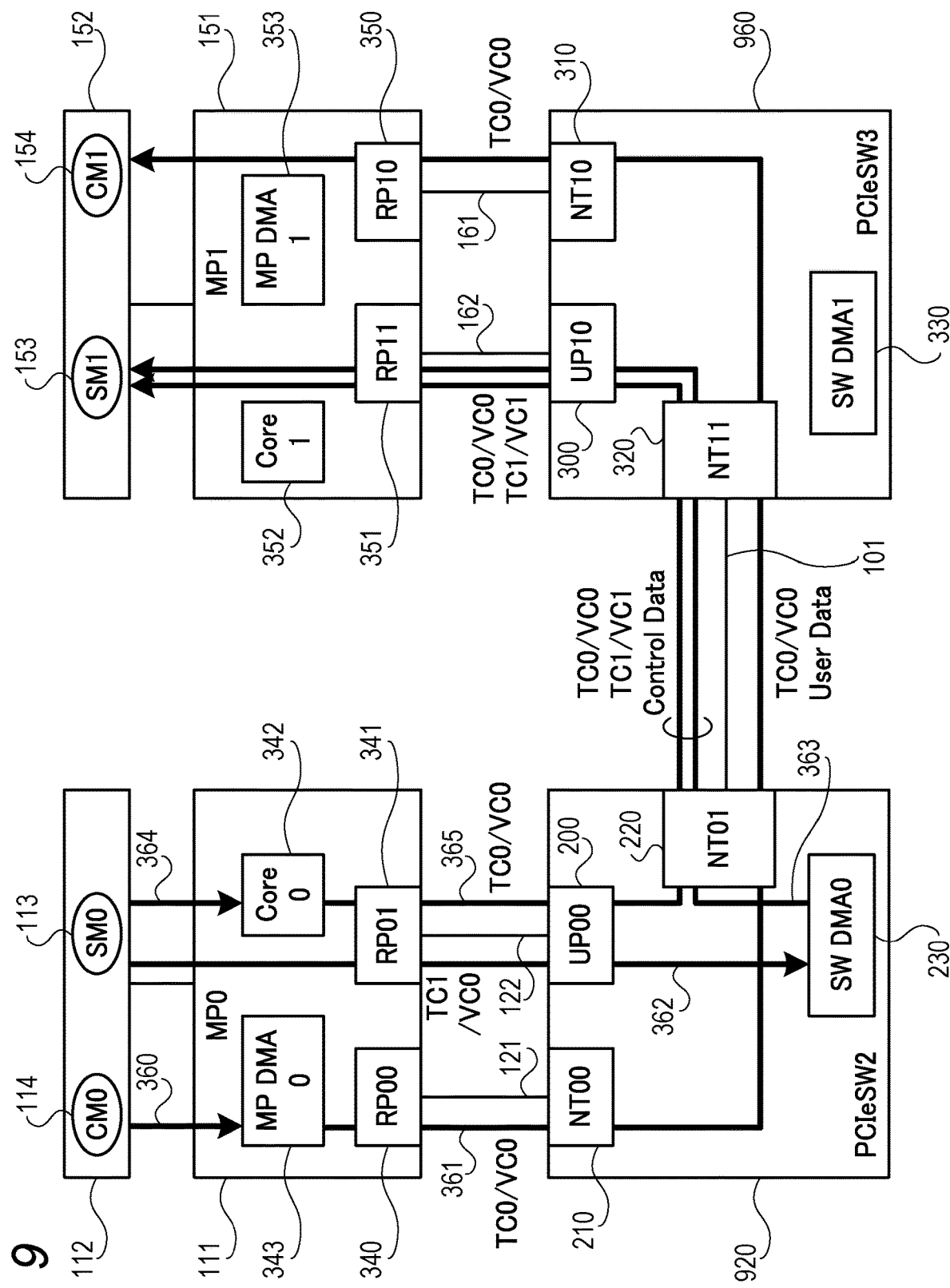
FIG. 9 is a diagram illustrating a second embodiment of the invention and illustrating another example of a data transfer path between storage controllers.

FIG. 9 is a diagram illustrating transfer paths of control data and user data from the storage controller 110 to the storage controller 150. The data transfer paths of FIG. 9 are the same as the data transfer paths of FIG. 3 illustrated in the first embodiment except for the fact that the PCIe switch 120 and the PCIe switch 160 are replaced by the PCIe switch 920 and the PCIe switch 960, respectively.

It is set such that PCIe packets set to the traffic classes TC0 and TC1 are transferred using the virtual channel VC0 on the PCIe links 121, 122, 161, and 162.

It is set such that a PCIe packet set to the traffic class TC0 is transferred using the virtual channel VC0 and a PCIe packet set to the traffic class TC1 is transferred using the virtual channel VC1 on the inter-controller link 101.

FIG. 10 is a table illustrating how to use the traffic class and the virtual channel in the storage system of the second embodiment.

In the PCIe link (1001) between the processor and the PCIe switch, data transfer of user data (1003) is performed on the virtual channel VC0 in the PCIe packet set to the traffic class TC0. Here, the PCIe links (1001) between the processor and the PCIe switch corresponds to the PCIe links 121 and 161 in FIG. 9.

In the inter-controller link 101 (1002), data transfer of the user data (1003) is performed on the virtual channel VC0 in the PCIe packet set to the traffic class TC0.

In the case of the control data transfer by core write (MP Core), data transfer of control data (1004) is performed on the virtual channel VC0 in the PCIe packet set to the traffic class TC0 in the PCIe link (1001) between the processor and the PCIe switch. Here, the PCIe links (1001) between the processor and the PCIe switch corresponds to the PCIe links 122 and 162 in FIG. 9.

In the inter-controller link 101 (1002), the data transfer of the control data (1004) by core write is performed on the virtual channel VC0 in the PCIe packet set to the traffic class TC0.

In the case of the control data transfer by the DMA controller 230 or 330 (SW DMA) built in the PCIe switch, data transfer of control data (1005) in the PCIe link (1001) between the processor and the PCIe switch is performed on the virtual channel VC0 in a PCIe packet set to the traffic class TC1.

In the inter-controller link 101 (1002), data transfer of the control data (1005) by the DMA controller 230 or 330 built in the PCIe switch is performed on the virtual channel VC1 in a PCIe packet set to the traffic class TC1.

FIG. 11 illustrates a setting example of virtual channel arbitration in the NTB 220 and the NTB 320. A transfer priority (1103) of the virtual channel VC0 (1101) is set to "Low", and a transfer priority (1103) of the virtual channel VC1 (1102) is set to "High".

With this setting, the transfer of the control data using the virtual channel VC1 set to the traffic class TC1 by the DMA controller 230 or 330 built in the PCIe switch is prioritized over the transfer of the user data which is set to TC0 by the DMA controller 343 or 353 built in the processor and uses the virtual channel VC0, on the inter-controller link 101.

The control data by core write is transferred on the inter-controller link 101 using the same virtual channel VC0 as the user data. Even in the storage system of the second embodiment, the control data by the core write can be transferred in preference to the user data with the same setting as the arbitration table 500 of FIG. 5 in the first embodiment.

As described above, the storage system 100 of the second embodiment can transfer the control data in preference to the user data with the combination of setting of port arbitration and virtual channel arbitration in the NTBs 220 and 320 connecting the inter-controller link 101.

Third Embodiment

A storage system according to a third embodiment of the invention and processing thereof will be described with reference to FIG. 12. A configuration of the storage system of the third embodiment is the same as that of the storage system 100 of the second embodiment described above except for a part of the configuration, and thus, the description based on the drawings will be omitted.

The storage system of the third embodiment includes PCIe switches 920 and 960 that can use a plurality of virtual channels instead of the PCIe switches 120 and 160 in the storage system 100 of FIG. 1, which is similar to the second embodiment.

Further, the inter-controller link 101 can use two virtual channels, that is, the virtual channels VC0 and VC1, which is different from the storage system 100 according to the first embodiment. In addition, the PCIe switch built-in DMA controllers 230 and 330 built in the PCIe switches 920 and 960, respectively, can perform data transfer using PCIe packets of which traffic classes are set to TC1. Further, it is assumed that the processors 111 and 151 can transmit the PCIe packets set to the traffic class TC1.

FIG. 12 is a table illustrating how to use the traffic class and the virtual channel in the storage system of the third embodiment.

In the PCIe link (1201) between the processor and the PCIe switch, data transfer of user data (1203) is performed on the virtual channel VC0 in the PCIe packet set to the traffic class TC0.

In the inter-controller link 101 (1202), data transfer of the user data (1203) is performed on the virtual channel VC0 in the PCIe packet set to the traffic class TC0.

In the case of the control data transfer by core write (MP Core), data transfer of control data (1204) is performed on the virtual channel VC0 in the PCIe packet set to the traffic class TC1 in the PCIe link (1201) between the processor and the PCIe switch.

In the inter-controller link 101 (1202), the data transfer of the control data (1204) by core write is performed on the virtual channel VC1 in the PCIe packet set to the traffic class TC1.

In the case of the control data transfer by the DMA controller 230 or 330 (SW DMA) built in the PCIe switch, data transfer of control data (1205) in the PCIe link (1201)

between the processor and the PCIe switch is performed on the virtual channel VC0 in a PCIe packet set to the traffic class TC1.

In the inter-controller link 101 (1202), data transfer of the control data (1205) by the DMA controller 230 or 330 built in the PCIe switch is performed on the virtual channel VC1 in a PCIe packet set to the traffic class TC1.

In the storage system 100 of the third embodiment, the virtual channel arbitration illustrated in FIG. 11 is set in PCIe switch ports connecting the inter-controller link 101, which is similar to the storage system of the second embodiment.

With this setting, the transfer of the control data set to the traffic class TC1 by core write and the DMA controller 230 or 330 built in the PCIe switch is prioritized over the transfer of the user data which is set to TC0 by the DMA controller built in the processor and uses the virtual channel VC0, on the inter-controller link 101.

As described above, the storage system of the third embodiment can transfer the control data in preference to the user data with setting of the virtual channel arbitration in the NTBs 220 and 320 connecting the inter-controller link 101.

Fourth Embodiment

A storage system according to a fourth embodiment of the invention and processing thereof will be described with reference to FIGS. 13 and 14. A configuration of the storage system of the fourth embodiment is the same as that of the storage system of the second embodiment except for a part of the configuration, and thus, the description based on the drawings will be omitted. The storage system of the fourth embodiment includes PCIe switches 920 and 960 that can use a plurality of virtual channels instead of the PCIe switches 120 and 160 in the storage system 100 of FIG. 1, which is similar to the second embodiment.

Further, the inter-controller link 101 can use two virtual channels VC0 and VC1, which is different from the storage system 100 according to the first embodiment. In addition, the PCIe switch built-in DMA controllers 230 and 330 built in the PCIe switches 920 and 960, respectively, can perform data transfer using PCIe packets of which traffic classes are set to TC0 or TC1.

Furthermore, it is assumed that the NTB 220 and the NTB 320 connecting the inter-controller link 101 have functions capable of changing a traffic class of a PCIe packet to be transmitted to the inter-controller link 101 from TC0 to TC1.

Figure 13:
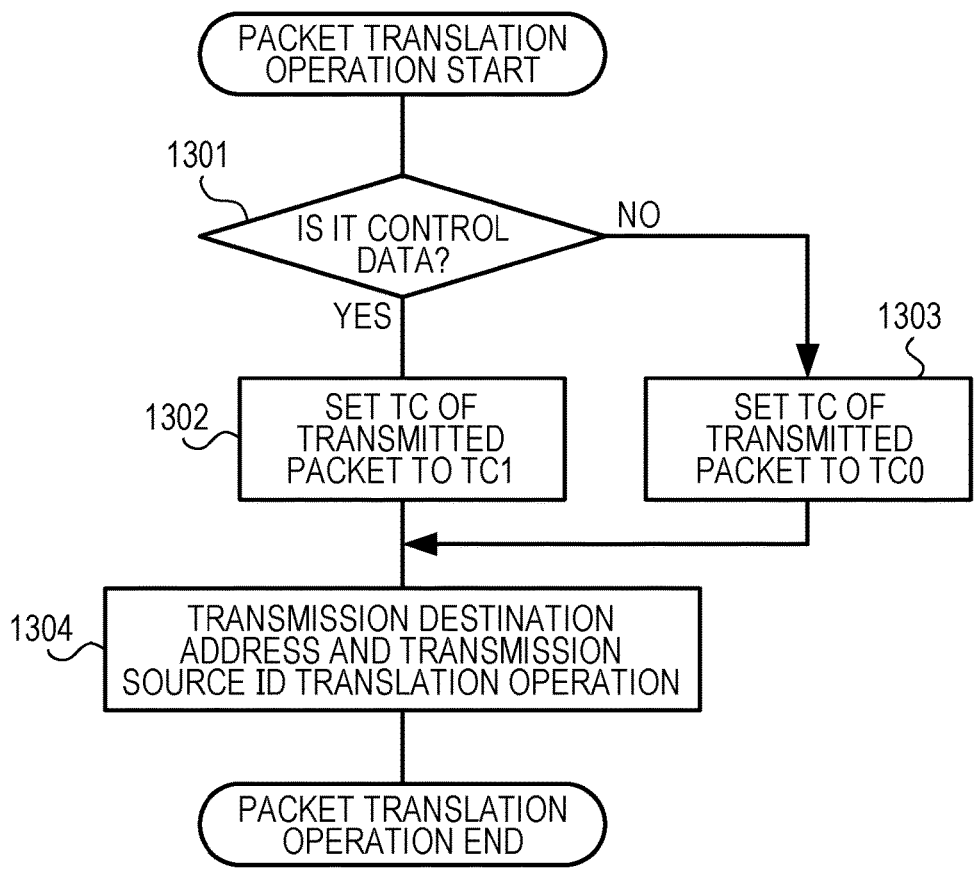
FIG. 13 is a flowchart illustrating a fourth embodiment of the invention and illustrating a procedure of a traffic class translation operation in an NTB.

FIG. 13 is a flowchart of a traffic class translation operation in the NTB 220 and the NTB 320.

The NTB 220 or the NTB 320 determines whether a PCIe packet to be transmitted to the inter-controller link 101 transfers control data or user data (1301). This can be easily determined by examining a transmission destination address of the PCIe packet. The process proceeds to Step 1302 when the PCIe packet is a PCIe packet to transfer the control data, and the process proceeds to Step 1303 when the PCIe packet is a PCIe packet to transfer the user data.

In Step 1302, the NTB 220 or the NTB 320 sets a traffic class of the PCIe packet transmitted from the inter-controller link 101 to TC1.

In Step 1303, the NTB 220 or the NTB 320 sets the traffic class of the PCIe packet transmitted from the inter-controller link 101 to TC0.

Next, in Step 1304, the NTB 220 or the NTB 320 performs the address translation operation described in FIG. 4 and a transmission source ID translation operation. The transmission source ID translation operation is one of processing required at the time of transmitting a PCIe packet across the NTB.

Figure 14:
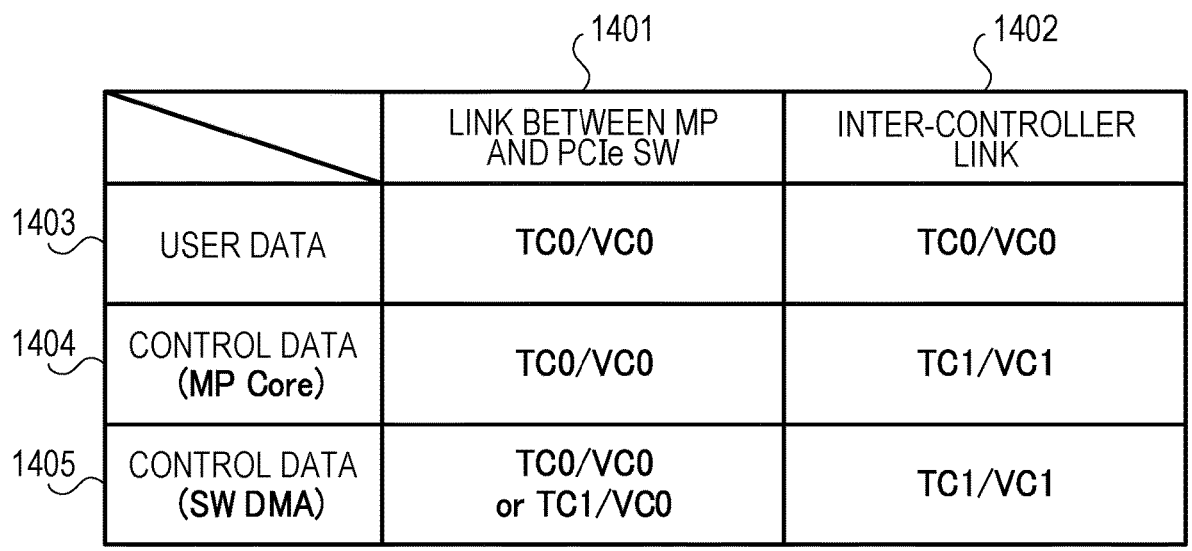
FIG. 14 is a table illustrating the fourth embodiment of the invention and illustrating another example of a relationship among a data type, a traffic class, and a virtual channel.

FIG. 14 is a table illustrating how to use the traffic class and the virtual channel in the storage system of the fourth embodiment.

In the PCIe link (1401) between the processor and the PCIe switch, data transfer of user data (1403) is performed on the virtual channel VC0 in the PCIe packet set to the traffic class TC0.

In the inter-controller link 101 (1402), data transfer of the user data (1403) is performed on the virtual channel VC0 in the PCIe packet set to the traffic class TC0.

In the case of the control data transfer by core write (MP Core), data transfer of control data (1404) is performed on the virtual channel VC0 in the PCIe packet set to the traffic class TC0 in the PCIe link (1401) between the processor and the PCIe switch.

In the inter-controller link 101 (1402), the data transfer of the control data (1404) by core write is performed on the virtual channel VC1 in the PCIe packet set to the traffic class TC1.

In the case of the control data transfer by the DMA controller 230 or 330 (SW DMA) built in the PCIe switch, data transfer of control data (1405) in the PCIe link (1401) between the processor and the PCIe switch is performed on the virtual channel VC0 in a PCIe packet set to the traffic class TC0 or TC1.

In the inter-controller link 101 (1402), data transfer of the control data (1405) by the DMA controller 230 or 330 built in the PCIe switch is performed on the virtual channel VC1 in a PCIe packet set to the traffic class TC1.

In the storage system of the fourth embodiment, the virtual channel arbitration illustrated in FIG. 11 is set in PCIe switch ports connecting the inter-controller link 101, which is similar to the storage system of the second embodiment.

With this setting, on the inter-controller link 101, the transfer of the control data by the core write and the DMA controller 230 or 330 built in the PCIe switch is changed to the transfer in the PCIe packet of the traffic class TC1 by the NTB 220 or 320, and the control data is transferred using the virtual channel VC1. As a result, the control data is prioritized over the user data transfer that is set to TC0 by the DMA controller 343 or 353 built in the processor and uses the virtual channel VC0.

As described above, the storage system of the fourth embodiment can transfer the control data in preference to the user data with the traffic class translation function and setting of the virtual channel arbitration in the NTBs 220 and 320 connecting the inter-controller link 101.

Fifth Embodiment

Figure 15:
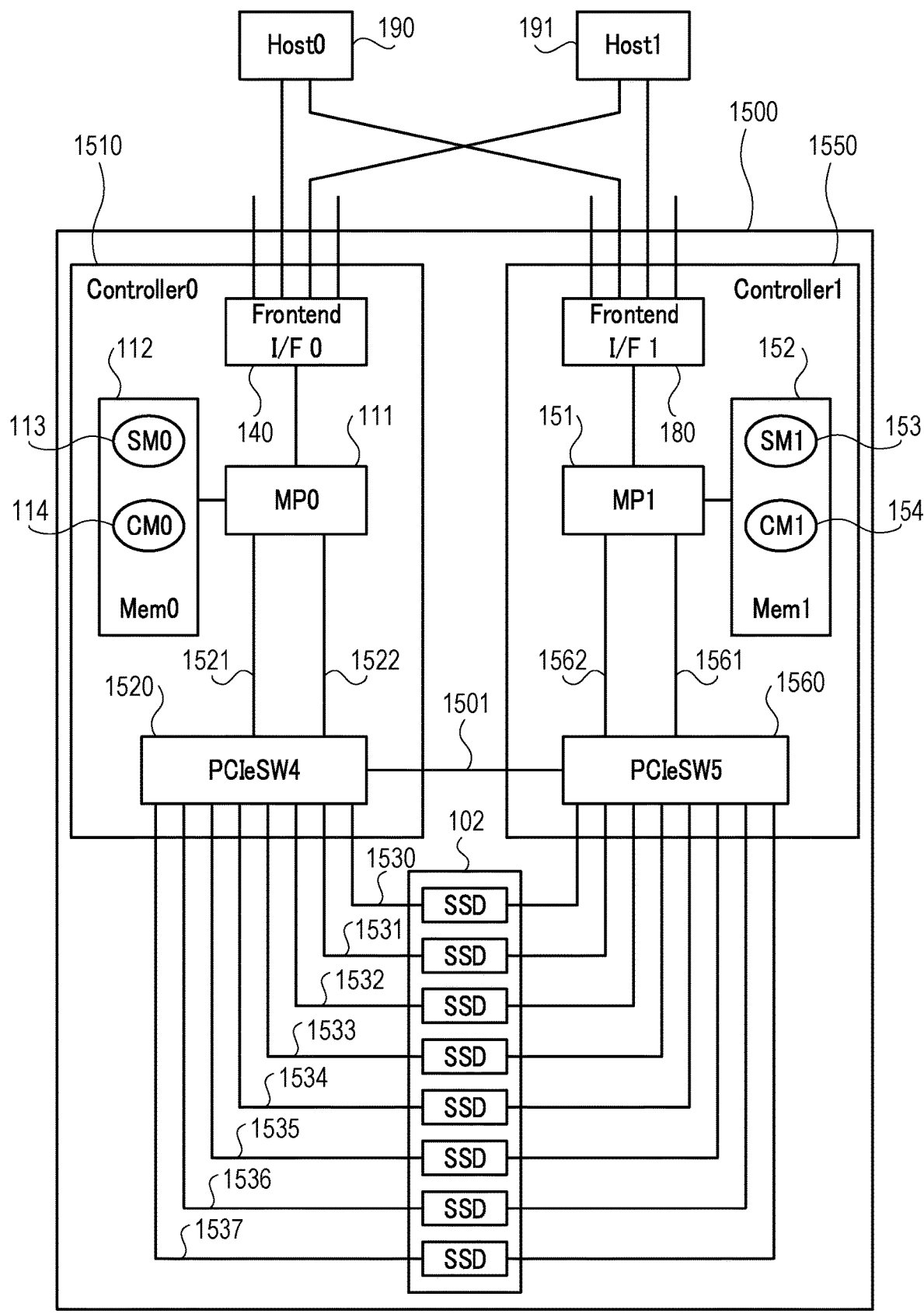
FIG. 15 is a block diagram illustrating a fifth embodiment of the invention and illustrating another example of a configuration of a storage system.

A storage system according to a fifth embodiment of the invention and processing thereof will be described with reference to FIGS. 15 to 17. FIG. 15 is a block diagram illustrating an example of a configuration of the storage system according to the fifth embodiment of the invention.

A storage system 1500 includes storage controllers 1510 and 1550 and a plurality of solid state drives (SSDs) 102. The storage system 1500 is obtained by removing the PCIe switches 120 and 160 connecting the inter-controller link 101 from the storage system 100 of the first embodiment.

Further, PCIe switches 1520 and 1560 connecting the processors 111 and 151 and the solid state drive 102, respectively, are provided instead of the PCIe switches 130 and 170 of the first embodiment. Furthermore, the PCIe switches 1520 and 1560 are connected by an inter-controller link 1501.

The processor 111 and the PCIe switch 1520 are connected by PCIe links 1521 and 1522. The processor 151 and the PCIe switch 1560 are connected by PCIe links 1561 and 1562. The PCIe switch 1520 and the solid state drives (SSDs) 102 are connected by PCIe links 1530 to 1537.

Figure 16:
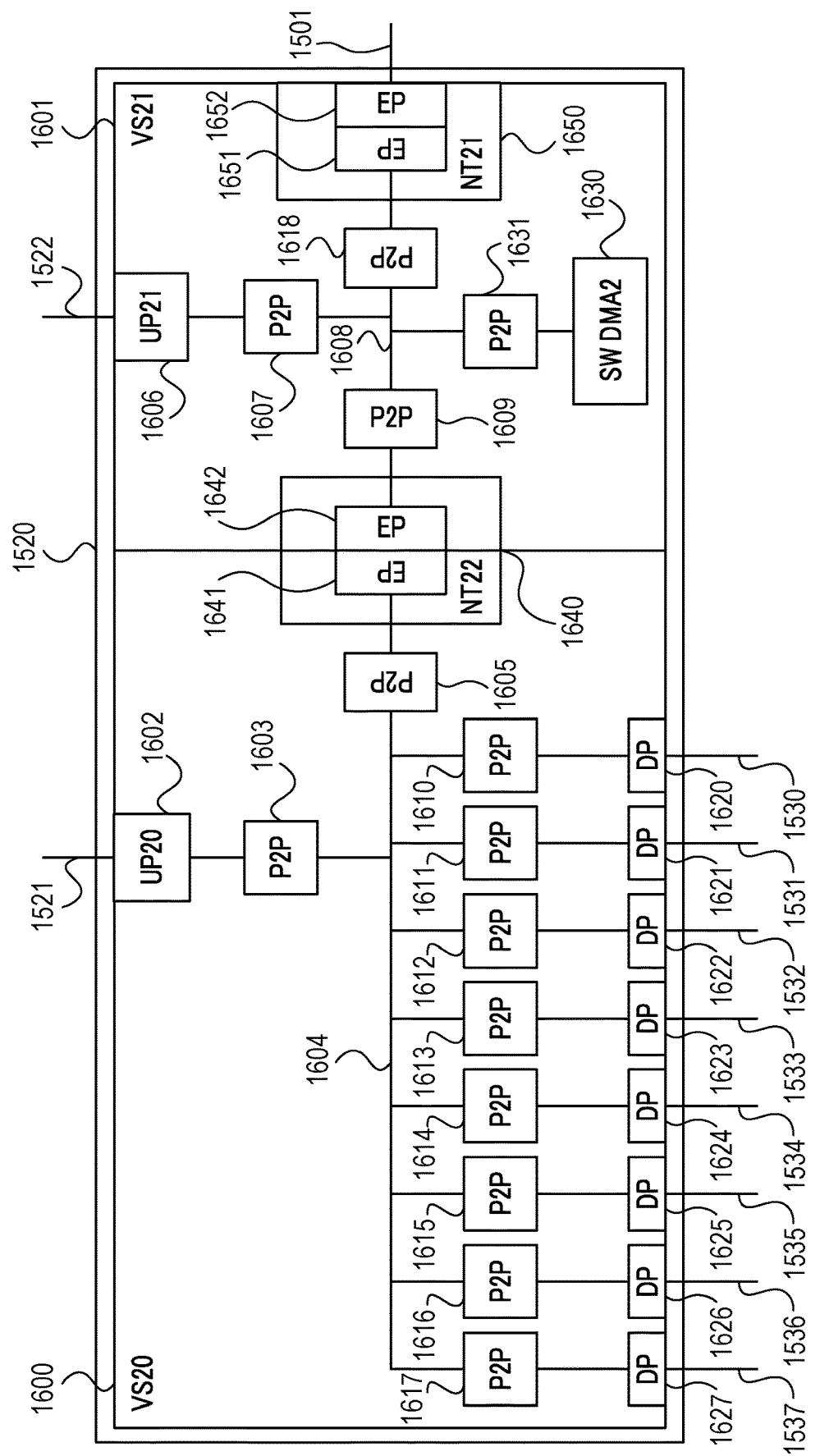
FIG. 16 is a block diagram illustrating the fifth embodiment of the invention and illustrating another example of a configuration inside a PCIe switch.

FIG. 16 illustrates an internal configuration of the PCIe switch 1520. The PCIe switch 1520 includes virtual switches 1600 (VS20) and 1601 (VS21).

The virtual switch 1600 includes: an upstream port 1602 connected to the PCIe link 1521; downstream ports 1620 to 1627 connected to the PCIe links 1530 to 1537; and an endpoint 1641 in an NTB 1640 (NT22).

The upstream port 1602 (UP20), the endpoint 1641, and the downstream ports 1620 to 1627 are connected to a P2P bridge 1603, a P2P bridge 1605, and P2P bridges 1610 to 1617, respectively. The P2P bridges 1603, 1605, and 1610 to 1617 are connected to an internal bus 1604.

The virtual switch 1601 includes: an upstream port 1606 (UP21) connected to the PCIe link 1522; an endpoint 1642 in the NTB 1640, an NTB 1650 (NT21), and a DMA controller 1630 (SW DMA) built in the PCIe switch.

The upstream port 1606, the endpoint 1642, the endpoint 1651, and the DMA controller 1630 built in the PCIe switch are connected to a P2P bridge 1607, a P2P bridge 1609, a P2P bridge 1618, and a P2P bridge 1631, respectively. The P2P bridges 1607, 1609, 1618, and 1631 are connected to an internal bus 1608.

The NTB 1640 includes the endpoints 1641 and 1642. The endpoint 1641 is set to be accessible from the processor 111 via the PCIe link 1521.

The endpoint 1642 is set to be accessible from the processor 111 via the PCIe link 1522. The endpoints 1641 and 1642 are set and connected such that PCIe packets of which transmission destinations are within a predetermined address range can pass in both directions.

The NTB 1650 includes the endpoint 1651 and the endpoint 1652. The endpoint 1651 is set to be accessible from the processor 111 via the PCIe link 1522. The endpoint 1652 is connected to the inter-controller link 1501. The endpoints 1651 and 1652 are set and connected such that PCIe packets of which transmission destinations are within a predetermined address range can pass in both directions.

An internal configuration of the PCIe switch 1560 is the same as that of the PCIe switch 1520, and thus, will not be described.

Figure 17:
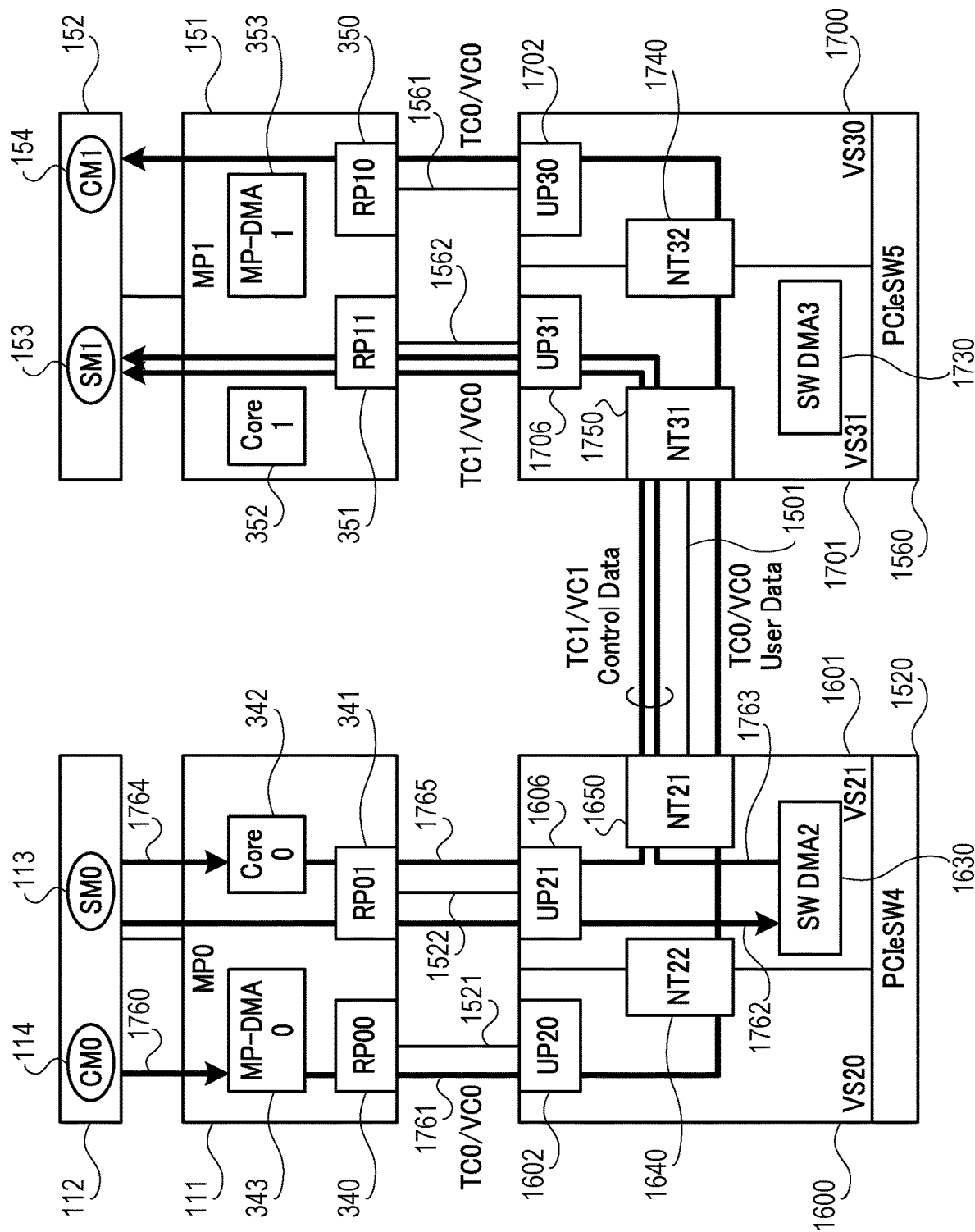
FIG. 17 is a diagram illustrating the fifth embodiment of the invention and illustrating another example of a data transfer path between storage controllers.

FIG. 17 is a diagram illustrating transfer paths of control data and user data from the storage controller 1510 to the storage controller 1550. The PCIe switch 1520 includes virtual switches 1600 (VS20) and 1601 (VS21). In addition, the PCIe switch 1560 includes virtual switches 1700 (VS30) and 1701 (VS31).

First, the transfer path of user data will be described. The user data is transferred from the cache memory 114 (CM0) to the cache memory 154 (CM1) as the processor 111 (MP0) controls the DMA controller 343 (MP DMA0) built in the processor.

The processor 111 generates a data transfer list in order to control the DMA controller 343 built in the processor. The DMA controller 343 built in the processor reads user data from the cache memory 114, which is a transfer source, based on the data transfer list (1760), and writes the user data to the root port 340 (1761).

The user data is transferred from the root port 340 to the cache memory 154 via the PCIe link 1521, the upstream port 1602, the NTB 1640, the NTB 1650, the inter-controller link 1501, the NTB 1750, the NTB 1740, the upstream port 1702, the PCIe link 1561, and the root port 350.

Next, the transfer path of control data will be described. In the case of transfer of control data by the core write, first, the processor core 342 reads the control data from the shared memory 113 (SM0) which is a transfer source (1764), and writes the control data to the root port 341 (1765). The control data is transferred from the root port 341 to the shared memory 153 (SM1) via the PCIe link 1522, the upstream port 1606, the NTB 1650, the inter-controller link 1501, the NTB 1750, the upstream port 1706, the PCIe link 1562, and the root port 351.

In the case of transfer of control data by the DMA controller 1630 built in the PCIe switch, the processor 111 generates a data transfer list to control the DMA controller 1630 built in the PCIe switch. The DMA controller 1630 built in the PCIe switch reads the control data from the shared memory 113, which is a transfer source, via the root port 341, the PCIe link 1522, and the upstream port 1606 based on the data transfer list (1762), and writes the control data to the NTB 1650 (1763).

The control data is transferred from the NTB 1650 to the shared memory 153 (SM1) via the inter-controller link 1501, the NTB 1750, the upstream port 1706, the PCIe link 1562, and the root port 351.

The same description is also applied for a path in the case of transferring control data from the storage controller 1550 to the storage controller 1510.

The user data is transferred from the cache memory 154 (CM1) to the cache memory 114 (CM0) as the processor 151 controls the DMA controller 353 built in the processor.

The processor 151 generates a data transfer list to control the DMA controller 353 built in the processor. The DMA controller 353 built in the processor reads user data from the cache memory 154, which is a transfer source, based on the data transfer list, and writes the user data to the root port 350.

The user data is transferred from the root port 350 to the cache memory 114 via the PCIe link 1561, the upstream port 1702, the NTB 1740, the NTB 1750, the inter-controller link 1501, the NTB 1650, the NTB 1640, the upstream port 1602, the PCIe link 1521, and the root port 340.

In the case of control data transfer by the core write, first, the processor core 352 reads the control data from the shared memory 153 which is a transfer source, and writes the control data to the root port 351. The control data is transferred from the root port 351 to the shared memory 113 via the PCIe link 1562, the upstream port 1706, the NTB 1750, the inter-controller link 1501, the NTB 1650, the upstream port 1606, the PCIe link 1522, and the root port 341.

In the case of transfer of control data by the DMA controller 1730 built in the PCIe switch, the processor 151 generates a data transfer list to control the DMA controller 1730 built in the PCIe switch. The DMA controller 1730 of the PCIe switch reads the control data from the shared memory 153, which is a transfer source, via the root port 351, the PCIe link 1562, and the upstream port 1706 based on the data transfer list, and writes the control data to the NTB 1750.

The control data is transferred from the NTB 1750 to the shared memory 113 via the inter-controller link 1501, the NTB 1650, the upstream port 1606, the PCIe link 1522, and the root port 341.

It is set such that PCIe packets set to the traffic classes TC0 and TC1 are transferred using the virtual channel VC0 on the PCIe links 1521, 1522, 1561, and 1562.

It is set such that a PCIe packet set to the traffic class TC0 is transferred using the virtual channel VC0 and a PCIe packet set to the traffic class TC1 is transferred using the virtual channel VC1 on the inter-controller link 1501.

The user data is transferred by the DMA controllers 343 and 353 built in the processors in the PCIe packet set to the traffic class TC0. The control data is transferred by the DMA controllers 1630 and 1730 built in the PCIe switches in the PCIe packet set to the traffic class TC1.

The PCIe packet including the control data transmitted from the processor core 342 or 352 by core write is translated into the PCIe packet of the traffic class TC1 when transmitted from the NTB 1650 or 1750 to the inter-controller link 1501.

Furthermore, the virtual channel arbitration illustrated in FIG. 11 is set in the NTB 1650 and 1750 that are PCIe switch ports connecting the inter-controller link 1501, which is similar to the storage system of the second embodiment. As described above, the control data is transferred in preference to the user data on the inter-controller link 1501.

On PCIe packets passing through the NTBs, the PCIe switches 1520 and 1560 perform the same address translation operation as the PCIe switches 120 and 160 in the storage system 100 of the first embodiment as illustrated in the description of FIG. 4.

In the storage system 1500, transfer of read/write data with respect to the solid state drive (SSD) 102 is also congested, in addition to the control data and the user data, on the PCIe switches 1520 and 1560.

However, as illustrated in FIG. 17, the virtual switches 1600 and 1700 to which user data and drive read/write data are transferred and the virtual switches 1601 and 1701 to which the control data and the user data are transferred are logically divided. Furthermore, the control data is transferred in a PCIe packet set to a traffic class having a higher transfer priority than the user data. As a result, the control data can be transferred between the storage controllers 1510 and 1550 without being affected by the transfer of the user data and the drive read/write data.

Sixth Embodiment

Figure 18:
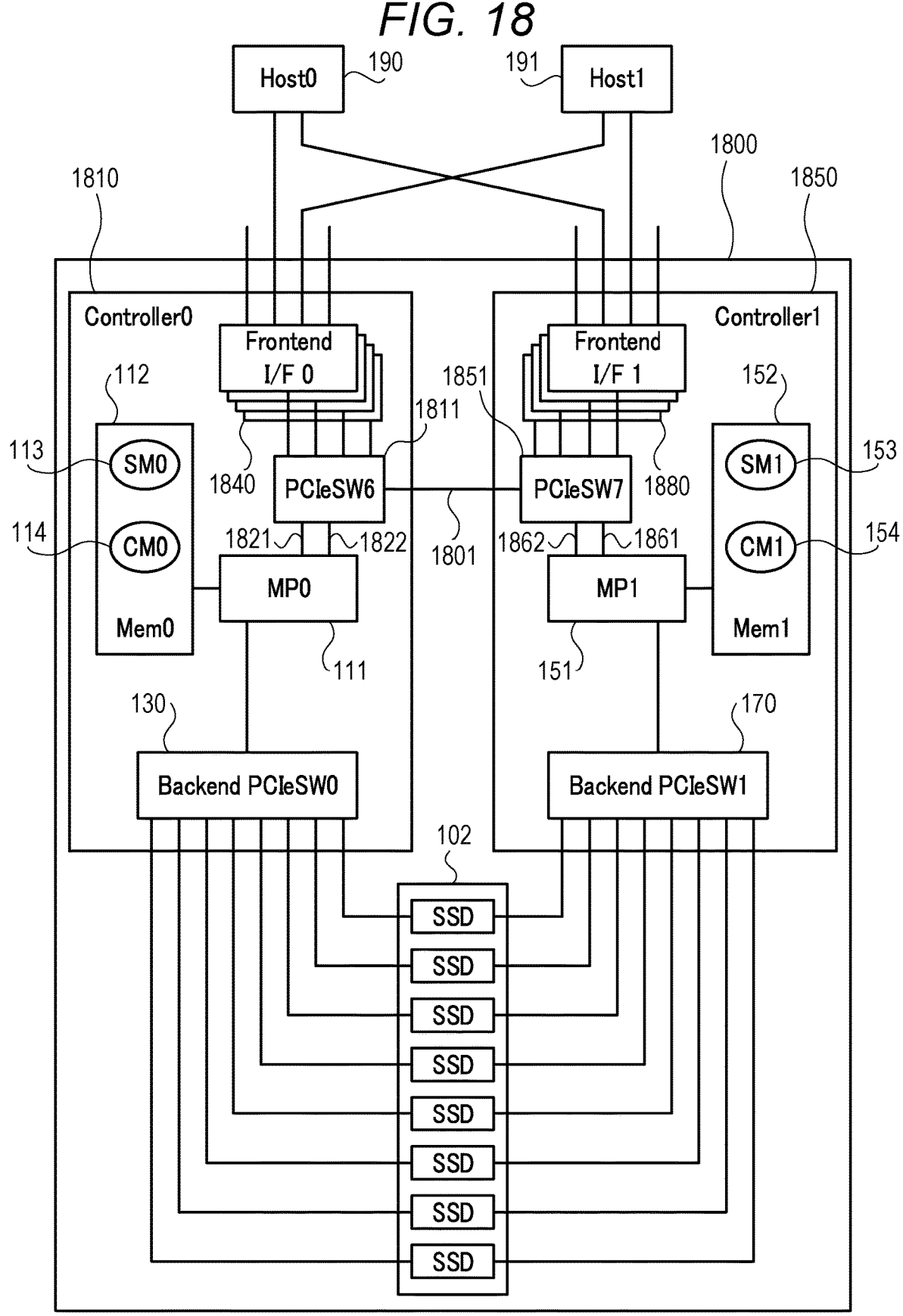
FIG. 18 is a block diagram illustrating a sixth embodiment of the invention and illustrating another example of a configuration of a storage system.

A storage system 1800 according to a sixth embodiment of the invention and processing thereof will be described with reference to FIG. 18. FIG. 18 is a block diagram illustrating an example of a configuration of the storage system according to the sixth embodiment of the invention.

A storage system 1800 includes storage controllers 1810 and 1850 and a plurality of solid state drives (SSDs) 102. The storage system 1800 is obtained by removing the PCIe switches 120 and 160 connecting the inter-controller link 101 from the storage system 100 of the first embodiment.

Further, PCIe switches 1811 and 1851 connecting the processors 111 and 151 and a plurality of frontend interfaces 1840 and 1880, respectively, are provided instead of the PCIe switches 130 and 170. Furthermore, the PCIe switches 1811 and 1851 are connected by an inter-controller link 1801.

The processor 111 and the PCIe switch 1811 are connected by PCIe links 1821 and 1822. The processor 151 and the PCIe switch 1851 are connected by PCIe links 1861 and 1862. The storage system 1800 of the sixth embodiment is suitable when the multiple frontend interfaces 1840 and 1880 are required to connect a large number of host systems.

Internal configurations of the PCIe switches 1811 and 1851 are the same as that of the PCIe switch 1520 of FIG. 16 illustrated in the fifth embodiment, and thus, will not be described.

In addition, details of transfer of control data and user data between the storage controllers are the same as those of the storage system 1500 of the fifth embodiment, and thus, will not be described.

According to the sixth embodiment, it is possible to realize the storage system that transfers the control data in preference to the user data even when the inter-controller link 1801 is used to connect the PCIe switches 1811 and 1851 which connect the processors 111 and 151 and the plurality of frontend interfaces 1840 and 1880, respectively.

Seventh Embodiment

A storage system according to a seventh embodiment of the invention and processing thereof will be described with reference to FIGS. 19 to 20. The storage system of the seventh embodiment is characterized in that a plurality of storage nodes are interconnected by a PCIe switch.

Figure 19:
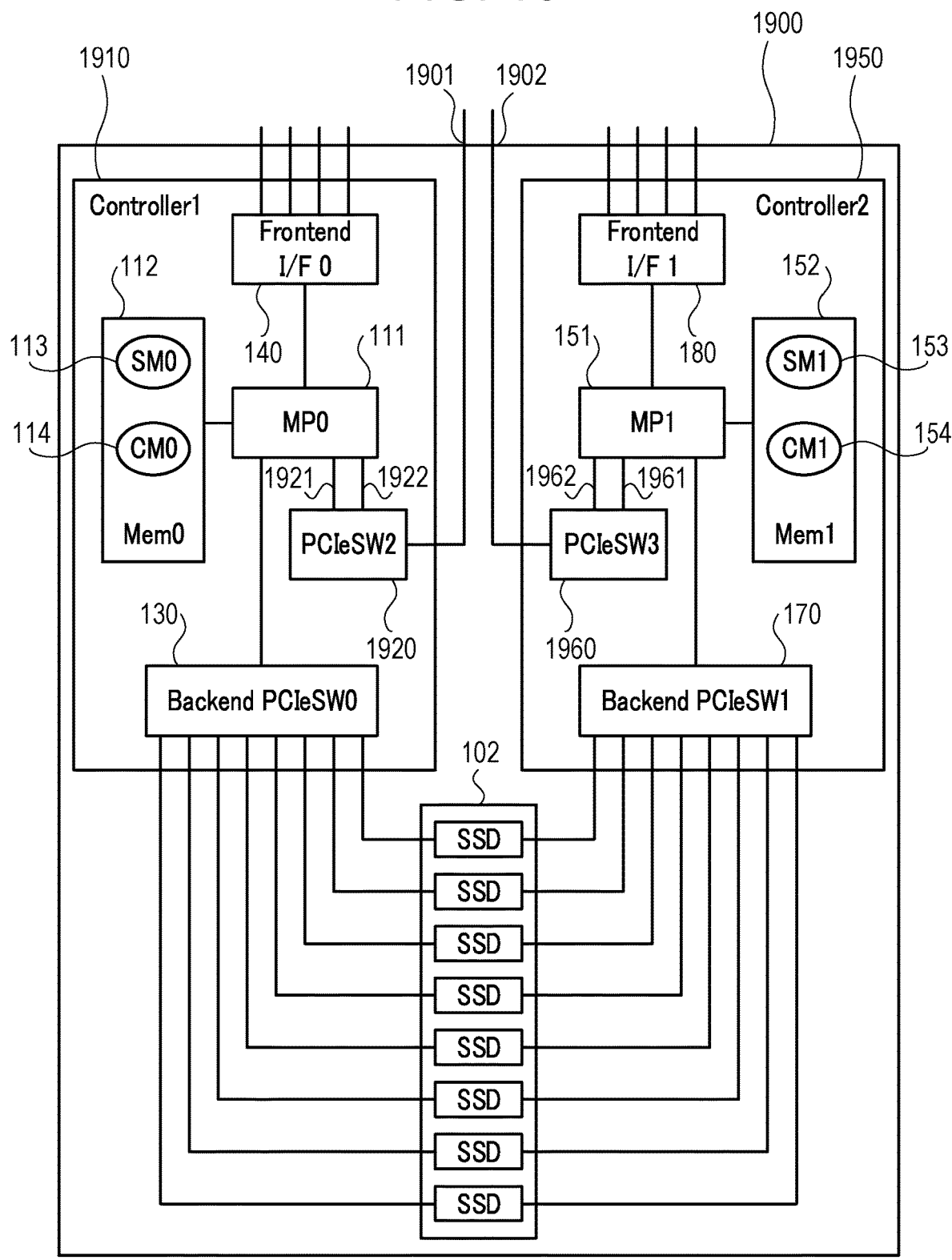
FIG. 19 is a block diagram illustrating a seventh embodiment of the invention and illustrating an example of a configuration of a storage node.

FIG. 19 illustrates a configuration example of the storage node in the storage system of the seventh embodiment of the invention. A storage node 1900 is constituted by storage controllers 1910 and 1950 and the plurality of solid state drives (SSDs) 102.

The storage node 1900 includes PCIe switches 1920 and 1960 instead of the PCIe switches 120 and 160 connecting the inter-controller link 101 in the storage system 100 of the first embodiment. The PCIe switches 1920 and 1960 are not directly connected, but are connected to external connection ports 1901 and 1902 configured for connection with other storage nodes, respectively.

The processor 111 and the PCIe switch 1920 are connected by PCIe links 1921 and 1922. The processor 151 and the PCIe switch 1960 are connected by PCIe links 1961 and 1962.

The PCIe switches 1920 and 1960 have the same configurations as the PCIe switches 920 and 960 according to the second to fourth embodiments. As a result, control data and user data are transmitted from the external connection ports 1901 and 1902, respectively, in a PCIe packet set to the traffic class TC1 and a PCIe packet set to the traffic class TC0.

Figure 20:
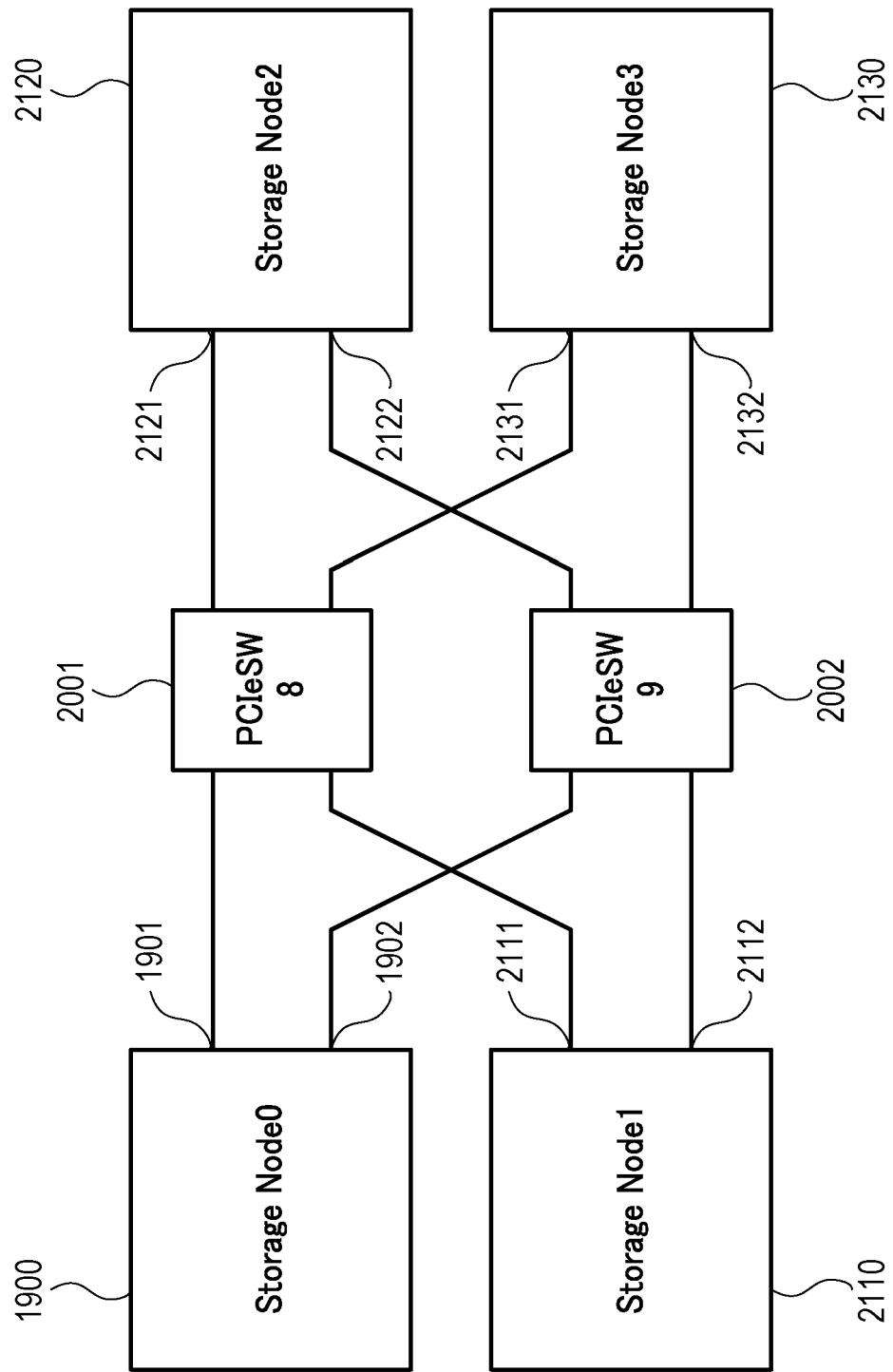
FIG. 20 is a block diagram illustrating a seventh embodiment of the invention and illustrating an example of connections among a plurality of storage nodes.

FIG. 20 illustrates the storage system of the seventh embodiment of the invention in which four storage nodes 1900, 2110, 2120, and 2130 are interconnected by PCIe switches 2001 and 2002.

The external connection port 1901 (see FIG. 19) of the storage node 1900 is connected to the PCIe switch 2001. The external connection port 1902 of the storage node 1900 is connected to the PCIe switch 2002. An external connection port 2111 of the storage node 2110 is connected to the PCIe switch 2001. An external connection port 2112 of the storage node 2110 is connected to the PCIe switch 2002.

An external connection port 2121 of the storage node 2120 is connected to the PCIe switch 2001. An external connection port 2122 of the storage node 2120 is connected to the PCIe switch 2002. An external connection port 2131 of the storage node 2130 is connected to the PCIe switch 2001. An external connection port 2132 of the storage node 2130 is connected to the PCIe switch 2002.

The PCIe switches 2001 and 2002 include two virtual channels VC0 and VC1. The respective storage nodes and the PCIe switches 2001 and 2002 are connected using PCIe links which can use a plurality of virtual channels including the virtual channels VC0 and VC1.

In PCIe ports connected to the respective storage nodes of the PCIe switches 2001 and 2002, the traffic class TC0 is mapped to the virtual channel VC0, and the traffic class TC1 is mapped to the virtual channel VC1.

As a result, control data transmitted from each storage node in a PCIe packet set to the traffic class TC1 is transferred in preference to user data transmitted in a PCIe packet set to the traffic class TC0.

According to the seventh embodiment, it is possible to realize the storage system that transfers the control data in preference to the user data in the storage system that connects a plurality of storage nodes to each other. In addition, it is possible to reduce the amount of wiring required to connect the plurality of storage nodes as compared to a case where control data and user data are transferred by different cables or the like.

Incidentally, the invention is not limited to the above-described embodiments and includes various modifications. For example, the above-described embodiments have been described in detail in order to describe the invention in an easily understandable manner, and are not necessarily limited to those including the entire configuration that has been described above. Further, some configurations of a certain embodiment can be substituted by configurations of another embodiment, and further, a configuration of another embodiment can be also added to a configuration of a certain embodiment. Further, addition, deletion, or substitution of other configurations can be made with respect to some configurations of each embodiment.

In addition, a part or all of each of the above-described configurations, functions, processing units, and the like may be realized, for example, by hardware by designing with an integrated circuit and the like. Further, each of the above-described configurations, functions, and the like may also be realized by software by causing a processor to interpret and execute a program for realizing each of the functions. Information such as programs, tables, and files that realize the respective functions can be stored in recording media of recording devices such as a memory, a hard disk, and an SSD.

In addition, only control lines and information lines considered to be necessary for the description have been illustrated, and all of the control lines and information lines required as a product are not necessarily illustrated. It may be considered that most of the configurations are practically connected to each other.

SUMMARY

As described above, the storage systems of the first to seventh embodiments can be configured as follows.

(1.) A storage system (100) including a first storage controller (110) and a second storage controller (150), wherein the first storage controller (110) includes: a first processor (111); a first memory (112) connected to the first processor (111); a first switch (PCIe switch 120) which is connected to the first processor (111) and has a first port (NTB 220); a cache memory area (114) which is set in the first memory (112) and stores user data; and a shared memory area (113) which is set in the first memory (112) and stores control data, the second storage controller (150) includes: a second processor (151); a second memory (152) connected to the second processor (151); a second switch (PCIe switch 160) which is connected to the second processor (151) and has a second port (NTB 320); a cache memory area (154) which is set in the second memory (152) and stores user data; and a shared memory area (153) which is set in the second memory (152) and stores control data, and in the storage system (100), the first port (220) and the second port (320) are connected by a first link (inter-controller link 101), the first processor (111) and the first switch (120) are connected by a second link (PCIe link 121) configured to transfer the user data and a third link (PCIe link 122) configured to transfer the control data, the second processor (151) and the second switch (160) are connected by a fourth link (PCIe link 161) configured to transfer the user data and a fifth link (PCIe link 162) configured to transfer the control data, and the first port (220) and the second port (320) transfer the control data in preference to the user data on the first link (101).

With the above configuration, the storage system 100 of the first embodiment can prevent the transfer performance of the control data from deteriorating due to congestion with the user data transfer even on the inter-controller link (101) of the storage controller equipped with a commodity processor including the only one virtual channel, and it is possible to improve the response performance of the storage system 100. As a result, a transfer time of the control data can be reduced, and the performance of the storage system 100 can be improved.

(2.) The storage system (100) according to (1.), wherein the first processor (111) and the second processor (151) have a DMA controller (343) built in the first processor (111) and a DMA controller (353) built in the second processor (151), respectively, the first switch (120) and the second switch (160) have a DMA controller (230) built in the first switch (120) and a DMA controller (330) built in the second switch (160), respectively, and the DMA controller (343) built in the first processor (111) or the DMA controller (353) built in the second processor (151) transfers the user data, and the DMA controller (230) built in the first switch (120) or the DMA controller (330) built in the second switch (160) transfers control data, between the first storage controller (110) and the second storage controller (150).

With the above configuration, the storage system 100 transfer the user data and control data respectively using the DMA controllers 343 and 353 built in the processors and the DMA controllers 230 and 330 built in the PCIe switches on the different data transfer paths. Then, the control data is preferentially transferred in the ports (NTBs 220 and 320) of the PCIe switches 120 and 160 where the both join together so that the transfer time of the control data can be shortened.

(3.) The storage system (100) according to (2.) above, wherein the first storage controller (110) or the second storage controller (150) causes the DMA controller (230) built in the first switch (120) or the DMA controller (330) built in the second switch (160) to transfer the control data when a size of the control data to be transferred is a predetermined value or larger, and causes the first processor (111) or the second processor (151) to execute a memory write command and transfer the control data when the size of the control data to be transferred is smaller than the predetermined value.

With the above configuration, when the size of the control data is smaller than the predetermined value (or threshold), the transfer by core write can reduce the transfer time of the control data more than the transfer by the DMA controllers 230 and 330 built in the PCIe switches.

(4.) The storage system (100) according to (1.) above, wherein the first link (101), the second link (121), and the fourth link (161) are connected to a non transparent bridge (NTB 220 or 320) included in the first switch (120) or the second switch (160), and the third link (122) and the fifth link (162) are connected to an upstream port (200 or 300) of the first switch (120) or the second switch (160).

With the above configuration, the user data from the second link (121) or the fourth link (161) and the control data from the third link (122) or the fifth link (162) can be transmitted to the first link (inter-controller link 101) in a aggregated manner in the non transparent bridge (NTB 220 or 320).

(5.) The storage system (100) according to (1.) above, wherein the first link (101) includes a plurality of virtual channels (VC0 and VC1), the user data and the control data are transferred in the virtual channels (VC0 and VC1) different from each other on the first link (101), and the first port (220) and the second port (320) transfer the control data to be transferred in the virtual channel in preference to the user data.

With the above configuration, the user data and the control data are transferred in the different virtual channels of the inter-controller link 101 so that it is possible to implement priority control such as a traffic class and preferentially transfer the control data.

(6.) The storage system (100) according to (5.) above, wherein the DMA controller (230) built in the first switch (120) or the DMA controller (330) built in the second switch (160) transfers the control data on the first link (101) in a packet set to a higher transfer priority than a packet to transfer the user data.

When the transfer priority of the packet to transfer the control data is set to be higher than the transfer priority of the packet to transfer the user data, the DMA controller 230 or 330 built in the switch can preferentially transfer the control data on the virtual channel of the inter-controller link 101.

(7.) The storage system (100) according to (5.) above, wherein the first switch (120) or the second switch (160) translates a transfer priority of a packet to transfer the control data into a transfer priority higher than a transfer priority of a packet to transfer the user data, and transmits the control data to the first link (101).

When the transfer priority of the packet to transfer the control data is set to be higher than the transfer priority of the packet to transfer the user data, the PCIe switches 920 and 960 can preferentially transfer the control data on the virtual channel of the inter-controller link 101.

(8.) The storage system (100) according to (5.) above, wherein the first switch (120) includes a first virtual switch (1600) and a second virtual switch (1601), the first virtual switch (1600) and the second virtual switch (1601) connected by a first non transparent bridge (NTB 1640), the second switch (160) includes a third virtual switch (1700) and a fourth virtual switch (1701), the third virtual switch (1700) and the fourth virtual switch (1701) connected by a second non transparent bridge (NTB 1740), the second link (1521) is connected to an upstream port (1602) of the first virtual switch (1600), the third link (1522) is connected to an upstream port (1606) of the second virtual switch (1601), the fourth link (1561) is connected to an upstream port (1702) of the third virtual switch (1700), the fifth link (1562) is connected to an upstream port (1706) of the fourth virtual switch (1701), the second virtual switch (1601) includes the first port (1650), and the fourth virtual switch (1701) includes the second port (1750).

With the above configuration, the virtual switches 1600 and 1700 to which user data and drive read/write data are transferred and the virtual switches 1601 and 1701 to which the control data and the user data are transferred are logically divided. Then, the control data is transferred in a PCIe packet set to a traffic class having a higher transfer priority than the user data. As a result, the control data transfer in the virtual switches 1601 and 1701 are not affected by the transfer of the user data and the drive read/write data, and the control data can be preferentially transferred between the storage controllers 1510 and 1550.

(9.) The storage system (100) according to (8.), wherein the first virtual switch (1600) or the third virtual switch (1700) connects a frontend interface (140) or a solid state drive (102).

With the above configuration, the virtual switches 1601 and 1701 can preferentially transfer the control data between the storage controllers 1510 and 1550 without being affected by the transfer of the user data and the drive read/write data between the frontend interface (140) and the solid state drive (102).

(10.) A storage system (1900) including a first storage controller (1910) and a second storage controller (1950), wherein the first storage controller (1910) includes: a first processor (111); a first memory (112) connected to the first processor (111); a first switch (1920) which is connected to the first processor (111) and has a first external connection port (1901); a cache memory area (114) which is set in the first memory (112) and stores user data; and a shared memory area (113) which is set in the first memory (112) and stores control data, the second storage controller (1950) includes: a second processor (151); a second memory (152) connected to the second processor (151); a second switch (1960) which is connected to the second processor (151) and has a second external connection port (1902); a cache memory area (154) which is set in the second memory (152) and stores user data; and a shared memory area (153) which is set in the second memory (152) and stores control data, and in the storage system (1900), the first processor (111) and the first switch (1920) are connected by a second link (1921) configured to transfer the user data and a third link (1922) configured to transfer the control data, the second processor (151) and the second switch (1960) are connected by a fourth link (1961) configured to transfer the user data and a fifth link (1962) configured to transfer the control data, and the first external connection port (1901) and the second external connection port (1902) include a plurality of virtual channels, the first external connection port (1901) and the second external connection port (1902) are connected to an external switch including a plurality of virtual channels, and the first external connection port (1901) and the second external connection port (1902) transfer the user data and the control data in the virtual channels different from each other.

With the above configuration, it is possible to realize the storage system that transfers the control data in preference to the user data in the storage system that connects a plurality of storage nodes to each other. In addition, it is possible to reduce the amount of wiring required to connect the plurality of storage nodes as compared to a case where control data and user data are transferred by different cables or the like.

What is claimed is:
1. A storage system comprising a first storage controller and a second storage controller, wherein
the first storage controller comprises:
a first processor;
a first memory connected to the first processor;
a first switch which is connected to the first processor and has a first port;
a cache memory area which is set in the first memory and stores user data; and a shared memory area which is set in the first memory and stores control data, the second storage controller comprises:
a second processor;
a second memory connected to the second processor;
a second switch which is connected to the second processor and has a second port;
a cache memory area which is set in the second memory and stores user data; and
a shared memory area which is set in the second memory and stores control data, the storage system connects:
the first port and the second port by a first link;
the first processor and the first switch by a second link configured to transfer the user data and a third link configured to transfer the control data; and
the second processor and the second switch by a fourth link configured to transfer the user data and a fifth link configured to transfer the control data, and
the first port and the second port transfer the control data in preference to the user data on the first link
wherein
the first link, the second link, and the fourth link are connected to a non transparent bridge included in the first switch or the second switch, and
the third link and the fifth link are connected to an upstream port of the first switch or the second switch.

2. The storage system according to claim 1, wherein
the first link includes a plurality of virtual channels,
the user data and the control data are transferred in the virtual channels different from each other on the first link, and
the first port and the second port transfer the control data to be transferred in the virtual channel in preference to the user data.

3. The storage system according to claim 2, wherein
a DMA controller built in the first switch or a DMA controller built in the second switch transfers the control data on the first link in a packet set to a higher transfer priority than a packet to transfer the user data.

4. The storage system according to claim 2, wherein
the first switch or the second switch translates a transfer priority of a packet to transfer the control data into a transfer priority higher than a transfer priority of a packet to transfer the user data, and transmits the control data to the first link.

5. The storage system according to claim 2, wherein
the first switch includes a first virtual switch and a second virtual switch, the first virtual switch and the second virtual switch connected by a first non transparent bridge,
the second switch includes a third virtual switch and a fourth virtual switch, the third virtual switch and the fourth virtual switch connected by a second non transparent bridge,
the second link is connected to an upstream port of the first virtual switch,
the third link is connected to an upstream port of the second virtual switch,
the fourth link is connected to an upstream port of the third virtual switch,
the fifth link is connected to an upstream port of the fourth virtual switch,
the second virtual switch includes the first port, and
the fourth virtual switch includes the second port.

6. The storage system according to claim 5, wherein
the first virtual switch or the third virtual switch connects a frontend interface or a solid state drive.

7. A storage system comprising a first storage controller and a second storage controller, wherein
the first storage controller comprises:
a first processor;
a first memory connected to the first processor;
a first switch which is connected to the first processor and has a first port;
a cache memory area which is set in the first memory and stores user data; and
a shared memory area which is set in the first memory and stores control data, the second storage controller comprises:
a second processor;
a second memory connected to the second processor;
a second switch which is connected to the second processor and has a second port;
a cache memory area which is set in the second memory and stores user data; and
a shared memory area which is set in the second memory and stores control data, the storage system connects:
the first port and the second port by a first link;
the first processor and the first switch by a second link configured to transfer the user data and a third link configured to transfer the control data; and
the second processor and the second switch by a fourth link configured to transfer the user data and a fifth link configured to transfer the control data, and
the first port and the second port transfer the control data in preference to the user data on the first link,
wherein
the first processor and the second processor have a DMA controller built in the first processor and a DMA controller built in the second processor, respectively,
the first switch and the second switch have a DMA controller built in the first switch and a DMA controller built in the second switch, respectively, and
between the first storage controller and the second storage controller, the DMA controller built in the first processor or the DMA controller built in the second processor transfers the user data, and the DMA controller built in the first switch or the DMA controller built in the second switch transfers control data.

8. The storage system according to claim 7, wherein
the first storage controller or the second storage controller causes the DMA controller built in the first switch or the DMA controller built in the second switch to transfer the control data when a size of the control data to be transferred is a predetermined value or larger, and causes the first processor or the second processor to execute a memory write command and transfer the control data when the size of the control data to be transferred is smaller than the predetermined value.

9. A storage system comprising a first storage controller and a second storage controller,
wherein the first storage controller comprises:
a first processor;
a first memory connected to the first processor;
a first switch which is connected to the first processor and has a first external connection port;
a cache memory area which is set in the first memory and stores user data; and
a shared memory area which is set in the first memory and stores control data, the second storage controller comprises:
- a second processor;
- a second memory connected to the second processor;
- a second switch which is connected to the second processor and has a second external connection port;
- a cache memory area which is set in the second memory and stores user data; and
- a shared memory area which is set in the second memory and stores control data, the storage system connects:

the first port and the second port by a first link;

the first processor and the first switch by a second link configured to transfer the user data and a third link configured to transfer the control data; and the second processor and the second switch by a fourth link configured to transfer the user data and a fifth link configured to transfer the control data, the first external connection port and the second external connection port include a plurality of virtual channels, the first external connection port and the second external connection port are connected to an external switch including a plurality of virtual channels, and the first external connection port and the second external connection port transfer the user data and the control data in the virtual channels different from each other wherein the first link, the second link, and the fourth link are connected to a non transparent bridge included in the first switch or the second switch, and the third link and the fifth link are connected to an upstream port of the first switch or the second switch.

* * * * *